US008030389B2

(12) United States Patent
Tej et al.

(10) Patent No.: US 8,030,389 B2
(45) Date of Patent: Oct. 4, 2011

(54) THERMAL INSULATION COMPOSITION

(75) Inventors: Mohammad Tej, Houston, TX (US);
David B. Young, Conroe, TX (US);
John B. Trenery, Sugar Land, TX (US);
Michael A. Jarrett, Houston, TX (US);
Floyd Harvey, Spring, TX (US);
Marvin L. Pless, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 1355 days.

(21) Appl. No.: 11/519,334

(22) Filed: Sep. 12, 2006

(65) Prior Publication Data
US 2008/0064804 A1    Mar. 13, 2008

(51) Int. Cl.
| A61K 9/16 | (2006.01) |
| B60C 1/00 | (2006.01) |
| C08F 8/30 | (2006.01) |
| C08J 3/00 | (2006.01) |
| C08J 7/02 | (2006.01) |
| C08K 3/34 | (2006.01) |
| C08K 5/06 | (2006.01) |
| C08K 9/04 | (2006.01) |
| C08L 37/00 | (2006.01) |
| C08L 39/00 | (2006.01) |
| C08L 23/18 | (2006.01) |
| C09B 67/00 | (2006.01) |
| C09D 11/10 | (2006.01) |
| C09K 5/00 | (2006.01) |
| C09K 8/06 | (2006.01) |
| C09K 8/12 | (2006.01) |
| C09K 8/32 | (2006.01) |
| C09K 8/60 | (2006.01) |
| C09K 8/68 | (2006.01) |
| C09K 8/528 | (2006.01) |
| C09K 8/588 | (2006.01) |
| D21H 19/58 | (2006.01) |
| E04B 1/74 | (2006.01) |
| E21B 21/00 | (2006.01) |
| E21B 33/00 | (2006.01) |

(52) U.S. Cl. ............ 524/445; 252/62; 252/73; 252/76; 507/120; 507/122; 507/136; 507/137; 507/200; 507/221; 507/224; 507/225; 507/226; 524/366; 524/377; 524/543; 524/549; 524/555; 524/570; 524/579

(58) Field of Classification Search .................. 507/120, 507/122, 136, 137, 200, 221, 224, 225, 226; 524/366, 377, 445, 446, 543, 549, 555, 570, 524/579; 252/62, 73, 76
See application file for complete search history.

(56) References Cited

U.S. PATENT DOCUMENTS

| 2,939,839 | A | 6/1960 | Brukner |
| 3,381,969 | A | 5/1968 | Crow et al. |
| 4,201,679 | A * | 5/1980 | Barker et al. ............... 507/120 |
| 4,258,791 | A | 3/1981 | Brandt et al. |
| 4,276,936 | A | 7/1981 | McKinzie |
| 4,573,533 | A | 3/1986 | Ryles et al. |
| 4,702,319 | A | 10/1987 | Bock et al. |
| 4,746,687 | A | 5/1988 | Ryles et al. |
| 4,877,542 | A | 10/1989 | Lon et al. |
| 4,984,635 | A | 1/1991 | Cullick et al. |
| 5,032,295 | A * | 7/1991 | Matz et al. ............... 507/118 |
| 5,290,768 | A | 3/1994 | Ramsay et al. |
| 5,677,267 | A | 10/1997 | Suarez et al. |
| 5,876,619 | A | 3/1999 | Skaggs et al. |
| 5,951,910 | A | 9/1999 | Skaggs et al. |
| 6,258,756 | B1 | 7/2001 | Hayatdavoudi |
| 6,489,270 | B1 | 12/2002 | Vollmer et al. |
| 6,559,082 | B1 | 5/2003 | Desvignes et al. |
| 6,933,341 | B2 | 8/2005 | Truong Dinh et al. |
| 7,651,980 | B2 * | 1/2010 | Jarrett et al. ............... 507/120 |
| 7,713,917 | B2 | 5/2010 | Wang et al. |
| 2004/0011990 | A1 | 1/2004 | Dunaway et al. |
| 2004/0059054 | A1 | 3/2004 | Lopez et al. |
| 2005/0038199 | A1 | 2/2005 | Wang et al. |
| 2006/0019834 | A1 | 1/2006 | Melbouci et al. |
| 2006/0131536 | A1 | 6/2006 | Qu et al. |

FOREIGN PATENT DOCUMENTS

| EP | 0 583 814 A1 | 2/1994 |
| WO | WO 02/062874 A1 | 8/2002 |
| WO | 2007-100570 A1 | 9/2007 |
| WO | 2008-001049 A1 | 1/2008 |

OTHER PUBLICATIONS

Patent Cooperation Treaty International Searching Authority United States of America (PCT/ISA/US), International Search Report, Feb. 22, 2008, Serial No. PCT/US07/76306,[4 pages].
PCT/ISA/US, Written Opinion, Feb. 22, 2008, Serial No. PCT/US07/76306, [5 pages].
Taylor, et al.; "Water-soluble hydrophobically associating polymers for improved oil recovery: A literature review"; J. of Petro. Sci. & Eng.; 1998; vol. 19; pp. 265-280.
Dodson; "Minicomputer aids offshore heater-treater insulation design"; Oil & Gas Journal; Dec. 12, 1977; pp. 59-64.
Sabhapondit, et al.; "Water soluble acrylamidomethyl propane sulfonate (AMPS) copolymer as an enhanced oil recovery chemical"; Energy & Fuels; 2003; vol. 17; pp. 683-688.
Son, et al.; "Gelatinous oil-base fluids as insulators in geothermal and oil-recovery applications"; Soc. of Petro. Eng.; 1983; SPE 11791; pp. 189-198.
Lesage; "Thermal protection of tubings"; French Petroleum Inst.; 1985; $2^{nd}$ Comm. Europe Communities New Technol. for the Explor. & Exploit of Oil & Gas Resources Symp.; 595-601.
Javora, et al.; "Development and application of insulating packer fluids in the Gulf of Mexico"; Soc. of Petro. Eng.; 2002; SPE 73729; pp. 1-8.

(Continued)

Primary Examiner — Patrick Niland
(74) Attorney, Agent, or Firm — The Morris Law Firm, P.C.; Paula Morris

(57) ABSTRACT

A thermal insulation composition comprising: aqueous base; one or more primary viscosifier comprising a quantity of clay; and, an amount of one or more polymeric viscosifier comprising sulfonate moiety.

30 Claims, 10 Drawing Sheets

OTHER PUBLICATIONS

Wang, et al.; "A new thermal insulating fluid and its application in deepwater riser insulation in the Gulf of Mexico"; Soc. of Petro. Eng.; 2003; SPE 84422; pp. 1-8.

Javora, et al.; "Water-based insulating fluids for deep-water riser applications"; Soc. of Petro. Eng.; 2004; SPE 88547; pp. 1-6.

Javora, et al.; "Managing deepwater flow assurance: unique riser design allows dual-annuli thermal insulating fluid installation"; Soc. of Petro. Eng.; 2005; SPE 96123; pp. 1-6.

Mi Swaco; "Proprietary computer modeling and SafeTherm packer fluid work to keep the heat on your production"; 2003 (brochure).

TETRA Technologies, Inc.; "Thermally insulating packer fluids"; 2003 (brochure).

BJ Services Company; "InsulGel™ packer fluids"; 2002 (brochure).

Eslinger, et al.; Clay minerals for petroleum geologists and engineers; 1988 (book).

State Intellectual Property Office of the People's Republic of China, "Notification of First Office Action," CN Patent Application No. 200780033936.2 based on PCT/US07/76306, mailed on Sep. 13, 2010 [8 pages].

* cited by examiner

THERMAL INSULATION COMPOSITION

FIELD OF THE APPLICATION

The present application relates to a thermal insulation composition.

BACKGROUND

In drilling and production applications where heat is applied, preserved, or recovered, thermal insulation design and efficiency impacts the efficiency of the process. Such applications include, for example, steam injection, arctic drilling, geothermal drilling, and the like. During such operations, wellbores typically are insulated to reduce heat transfer between the tubing, the casing, and the wellbore. Without effective insulation, heat from within the production tubing or transfer piping may thermally expand various components of the well. For example, expansion of the casing could damage the surrounding cement or break the bond between the casing and the cement. The well could collapse, fluid could leak from within the production tubing or transfer piping, and/or the casing could buckle or fail due to thermal stress.

Fluids comprising polymeric viscosifiers have potential for use in thermal insulation compositions. Unfortunately, polymeric viscosifiers tend to flocculate in the presence of temperature fluctuations over time. Eventually, flocculation of the polymeric viscosifiers tends to cause water separation and/or stratification, which renders the separated or stratified fluid less effective as a thermal insulation composition.

U.S. Patent Application 2004/0059054 apparently attempts to solve the foregoing problem using a thermal insulating packer fluid which comprises "at least one water superabsorbent polymer" which is said to be "capable in its dry state of absorbing and retaining a minimum of its own weight in water."

Thermal insulation compositions which comprise polymeric viscosifier(s) and which remain homogeneous when exposed to water and temperature differentials over time are needed.

SUMMARY

The present application provides a stable thermal insulation composition comprising one or more polymeric viscosifier(s).

The present application provides a thermal insulation composition comprising: aqueous base; one or more primary viscosifier comprising a quantity of clay; and, an amount of one or more polymeric viscosifier comprising sulfonate moiety.

In one embodiment, the application provides a thermal insulation composition comprising: aqueous base; one or more primary viscosifier comprising a quantity of sepiolite; and, an amount of one or more polymeric viscosifier comprising sulfonate moiety.

In one embodiment, the application provides a thermal insulation composition comprising: an aqueous base; about 86 kg/m³(30 lb/bbl) sepiolite clay; about 11.1 kg/m³(3.9 lb/bbl) 2 acrylamido-2-methyl propane sulfonic acid polymeric viscosifier; about 2.14 kg/m³ (0.75 lb/bbl) deflocculant; and, about 60 vol. % polyol composition.

DETAILED DESCRIPTION

Figure 1:
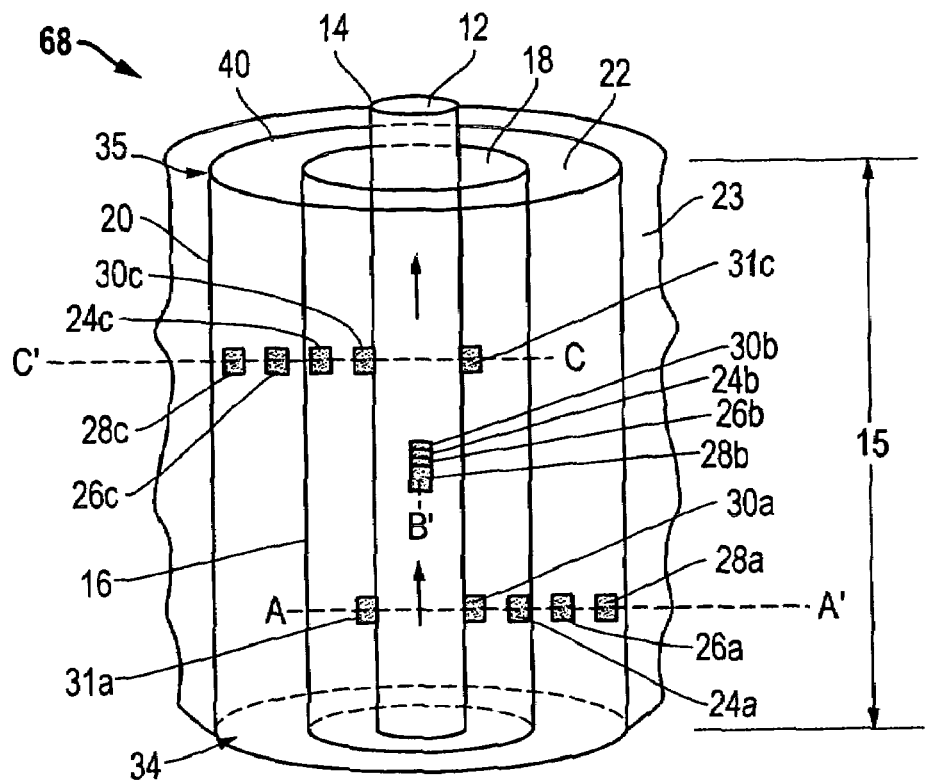
FIG. 1 is schematic diagram of a test cell for testing the thermal insulation composition.

The present application provides a stable thermal insulation composition comprising one or more polymeric viscosifier(s). The thermal insulation composition comprises an aqueous base fluid, one or more primary viscosifier comprising clay, and one or more polymeric viscosifier. In an advantageous embodiment, the polymeric viscosifier comprises sulfonate moiety. In an advantageous embodiment, the thermal insulation composition further comprises one or more deflocculant. In an advantageous embodiment, the thermal insulation composition further comprises one or more polyol.

The thermal insulating composition is stable, or remains homogeneous, upon exposure to temperature differentials. In one embodiment, the thermal insulating composition remains homogeneous for 14 days or more after exposure to static aging conditions comprising a temperature of 45.6° C.(150° F.) or more. In one embodiment, the thermal insulating composition remains homogeneous for 14 days or more after exposure to static aging conditions comprising a temperature of 121.1° C.(250° F.) or less. In one embodiment, the thermal insulating composition remains homogeneous for 14 days or more after exposure to static aging conditions comprising a temperature of 132.2° C.(270° F.) or less.

Production Operations

To extract hydrocarbons such as natural gas and crude oil from a subterranean formation, boreholes are drilled into hydrocarbon bearing production zones. Numerous systems have been employed to maintain the productivity of a borehole, to control the flow of hydrocarbon fluids from the borehole, while allowing only limited reservoir sand production and preventing natural forces from collapsing and obstructing or terminating fluid flow from the borehole.

One system provides a full depth casement of the wellbore, where the wellbore wall is lined with a steel casing pipe that is secured to the bore wall by an annulus of concrete between the outside surface of the casing pipe and the wellbore wall. The steel casing pipe and surrounding concrete annulus is thereafter perforated along the production zone to allow hydrocarbon fluids to flow from the producing formation into the casing pipe interior. Usually, the casing pipe interior is sealed above and below the producing zone, and a smaller diameter "production pipe" penetrates the upper seal to provide the hydrocarbon fluids a smooth and clean flowing conduit to the surface.

Undesired heat loss from production tubing as well as uncontrolled heat transfer to outer annuli can be detrimental to the mechanical integrity of outer annuli, cause productivity losses from the well. The combination of cold temperature and high pressure can lead to temperature cycling in the wellbore, salt precipitation, the formation of production-blocking hydrates, deposition of paraffins and/or asphaltenes. In addition, the permafrost can be destablized in arctic type regions.

The present application provides a thermal insulation composition having properties effective to reduce heat transfer from fluid in production tubing or transfer piping to one or more surrounding annuli and the environment. The thermal insulation composition also retains heat within fluid in the production tubing or transfer piping.

In one embodiment, the insulating fluid is placed in the annular space between a wellbore and a tubing string. When a hot fluid, such as steam or hot gas/oil, travels through the tubing, the insulating fluid reduces convection and heat transfer between the hot fluid, the tubing, and/or the casing. In one embodiment, the drilling operations are production operations.

Heat generally is transferred by three primary modes: conduction; convection; and, radiation. Radiation typically is not a factor during drilling/production operations. Free convection is a major mechanism for heat transfer in a wellbore. Free convection is fluid motion caused by the variation of fluid density with temperature. During production operations, another attribute of thermal insulation compositions is Cool Down Time (CDT), or the time required for the riser or transfer piping to cool down to the hydrate formation temperature after production has been interrupted.

CDT and heat loss due to convection and thermal conductivity may be reduced by viscosifying the thermal insulation composition. Increasing fluid viscosity decreases fluid motion and thereby decreases free-annular convection. The desired rheological profile for a thermal insulating composition includes high viscosity at low shear rate to reduce free convection caused by temperature differential. Also desirable is low viscosity at high shear rate, in order to facilitate placement of the insulating fluid at the desired location.

The onset of convection is a very low shear phenomenon. Most thermal insulation compositions are non-Newtonian gels, so viscosity is measured at very low shear rate. For example, viscosity is measured at about 0.09 sec$^{-1}$ (0.05 rpm), or about 1 revolution for every 20 minutes.

The Thermal Insulating Composition

In one embodiment, the thermal insulation composition is a packer or riser fluid. In one embodiment, the thermal insulation composition is a packer fluid. Typically, a packer fluid is introduced above the packer in an annulus. In one embodiment, the thermal insulation composition is a riser fluid. Typically, a riser fluid is introduced into a riser annulus.

When pumped into an annulus surrounding production tubing or transfer piping, the thermal insulation composition enhances the thermal insulating quality around the tubing or piping, thereby reducing heat loss from the production tubing or transfer piping. The heat loss is reduced, at least in part, by reducing free convection or fluid motion in the thermal insulation composition. Fluid motion is decreased by increasing the viscosity of the thermal insulation composition. Increasing the viscosity of the thermal insulation composition also decreases free annular convection.

In one embodiment, the thermal insulation composition has a viscosity of about 1800 cP or more at about 1 rpm or less at a temperature of from 4.4° C.(40° F.) to 65.6° C.(150° F.). In one embodiment, the thermal insulation composition has a viscosity of about 3500 cP or more at about 0.6 rpm or less at a temperature of from 4.4° C.(40° F.) to 65.6° C.(150° F.). In one embodiment, the thermal insulation composition has a viscosity of about 8000 cP or more at about 0.2 rpm or less at a temperature of from 4.4° C.(40° F.) to 65.6° C.(150° F.). In one embodiment, the thermal insulation composition has a viscosity of about 15,000 cp or more at 0.1 rpm or less at temperatures of from 4.4° C.(40° F.) to 65.6° C.(150° F.). In one embodiment, the thermal insulation composition exhibits all of the foregoing viscosities at the referenced temperatures.

In one embodiment, the thermal insulation composition has a viscosity of about 500 cP or less at about 60 rpm or more at a temperature of from 4.4° C.(40° F.) to 65.6° C.(150° F.). In one embodiment, the thermal insulation composition has a viscosity of about 300 cP or less at 200 rpm or more at temperatures of from 4.4° C.(40° F.) to 65.6° C.(150° F.). In one embodiment, the thermal insulation composition has a viscosity of about 200 cP or less at 200 rpm or more at temperatures of from 4.4° C.(40° F.) to 65.6° C.(150° F.). In one embodiment, the thermal insulation composition has a viscosity of about 180 cP or less at 600 rpm or more at temperatures of from 4.4° C.(40° F.) to 65.6° C.(150° F.). In one embodiment, the thermal insulation composition exhibits all of the foregoing viscosities at the referenced temperatures.

The viscosity and density of the thermal insulation composition may be varied to meet desired levels. Density is normally dictated by the required hydrostatic pressure needed to control the particular well. The density of the thermal insulation composition is controlled by operational considerations such as additives to the fluids, hydration time of the viscosifier, and requirements for low crystallization temperatures (both true crystallization temperature (TCT) and pressure crystallization temperature (PCT). Typically, the thermal insulation composition has a density of from about 1.1 kg/liter (9 lb/gal) to about 2.64 kg/liter (22 lb/gal).

The overall heat-transfer coefficient (U) is defined as:

$$U=Q/A(\Delta T)$$

where U is in BTU/hr ft$^2$ ° F. (or W/m$^2$ ° C.), Q is the heat rate (BTU/hr), A is the surface area, (Q/A is heat flux) and Δ T is the temperature differential between the pipe surface and the outer thermocouple fluid temperature.

The convective heat transfer coefficient (U) may be measured using a test cell. Substantially any wellbore model insulation fluid tester may be used to perform the test. Examples are described in SPE 73729, *Development and Application of Insulating Packer Fluids in the Gulf of Mexico*, P. Javora, et al (2002), incorporated herein by reference.

Figure 1A:
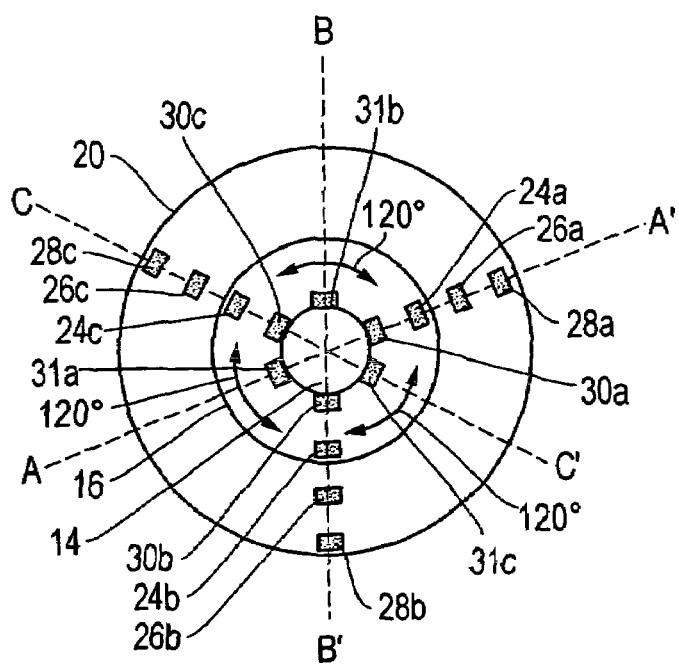
FIG. 1a is transparent cross sectional view showing the relative relation of thermocouples and heat flux sensor thermocouples around the circumference of the test cell of FIG. 1.

An example of a suitable test cell is described with reference to FIG. 1 and FIG. 1a. Referring to FIG. 1, the test cell 10 generally comprised a bore 12 defined by an internal pipe 14, which fits concentrically within a second pipe 16, forming an inner annulus 18. The second pipe 16 fits concentrically within an outer pipe 20, forming an outer annulus 22. The test cell 10 has a height 15. The internal pipe 14 may be made of any suitable material. In the Examples, the internal pipe 14 of the test cell 10 was aluminum. The bore 12 of the internal pipe 14 is in fluid communication with a source of hot fluid. In one embodiment, the hot fluid is water. Surrounding the test cell 10 is a jacket 23 for flowing cold fluid around the test cell to simulate contact, for example, with cold seawater.

The test cell 10 comprises three sets of three thermocouples with heat flux sensor/thermocouple(s) (hereinafter sometimes collectively referred to as a set or sets of thermocouples). Each set of thermocouples extends along a line A-A' (FIG. 1a) from a first heat flux sensor/thermocouple 31 at one edge of the internal pipe 14 along the diameter of the internal pipe 14 and to the outer pipe 20. Each set of thermocouples is located along one of line A-A', B-B', or C-C', which are spaced apart from one another at approximate 120° angles around the circumference of the test cell 10. Each set of thermocouples also is substantially equidistant from the adjacent set along the height 15 of the test cell 10. Each set of thermocouples also is placed substantially equidistant from one another beginning at the internal pipe and extending outward toward pipe 20 along one of the lines A-A', B-B', or C-C'.

The thermocouple readings and heat flux sensors are recorded. The readings may be recorded using any suitable recorder. An example is the _Digital Multimeter Model 34405A, commercially available form Agilent Technologies. Hot fluid is pumped through the bore 12. In one embodiment, the hot fluid is water. The temperature of the hot fluid is measured at or near the inlet into the bore 12, and the temperature of fluid leaving the bore is measured at or near the outlet from the bore 12. Flow meters measure the volume of cold fluid and hot fluid pumped through the test cell 10.

The thermal insulation composition is transferred into the outer annulus 22 of the test cell 10 using any suitable mechanism. In one embodiment, the fluid is pumped using a peristaltic pump. After the outer annulus 22 of the test cell 10 is full, cold fluid is circulated through a jacket surrounding the test cell 10, typically using a second pump. In one embodiment, seven gallons per minute of 3.3° C.(38° F.) water is flowed through a water jacket during the test. When the thermal insulation composition is cooled to 4.4° C.(40° F.), hot fluid at a temperature of about 60° C.(140° F.) is flowed through the bore 12 to begin heating the thermal insulation composition. Hot fluid is pumped through the bore 12 and the cold fluid is pumped through the jacket for approximately 12 to 16 hours. Thermocouple and heat flux sensor readings are taken at regular intervals. In one embodiment, readings are taken every ten seconds.

The convective heat transfer coefficient (U) for the thermal insulation composition, measured using the foregoing method, advantageously is 90% or more lower than the convective heat transfer coefficient measured for water under the same conditions. In one embodiment, the convective heat transfer coefficient for the thermal insulation composition is more than 90% lower than that measured for water under the same conditions. In one embodiment, the convective heat transfer coefficient for the thermal insulation composition is 93% or more lower than that measured for water under the same conditions. In one embodiment, the convective heat transfer coefficient for the thermal insulation composition is 95% or more lower than that measured for water under the same conditions. In one embodiment, U is 3.09 BTU/ft$^2$ hr ° F. (17.55 W/m$^{2°}$ C.). This convective heat transfer coefficient value is 95.69% lower than water.

In one embodiment, the thermal conductivity (k) is about 0.4 W/m° C. or less at 4.4° C.(40° F.). In one embodiment, k is about 0.38 W/m° C. or less at 4.4° C.(40° F.). In one embodiment, k is about 0.36 W/m° C. a or less at 4.4° C.(40° F.).

In one embodiment, k is about 0.3 W/m° C. or less at 93.3° C.(200° F.). In one embodiment, k is about 0.26 W/m° C. or less at 93.3° C.(200° F.). In one embodiment, k is about 0.22 or less at 93.3° C.(200° F.). In one embodiment, k is 0.2 W/m° C. at 93.3° C.(200° F.).

The thermal insulating composition may be produced in shore-based facilities, transported to, and pumped from marine well-servicing boats into riser annuli. This provides a convenient means to blend, temporarily store, and then pump large quantities of fluid into the wellbore and riser annuli, without using rig tanks.

The thermal insulation composition provides environmental benefits. In an advantageous embodiment, no oil sheen is produced if the composition is spilled because the composition is oil-free.

The thermal insulation composition is described in more detail below.

Aqueous Base

The thermal insulation composition comprises aqueous base. The aqueous base may be substantially any aqueous base. For example, the aqueous base may be freshwater or brine. The aqueous base also may comprise an oil-in-water emulsion-type fluid.

Primary Viscosifier

The thermal insulation composition comprises a primary viscosifier comprising clay. The word "clay" encompasses a large family of complex minerals containing the elements magnesium and/or aluminum, silicon, and oxygen (magnesium, aluminum silicates) combined in a sheet-like structure. The clay may be any clay which is dispersible in the aqueous base and which is effective to viscosity the aqueous base. Clay is not considered "polymeric."

In one embodiment, the clay is selected from the group consisting of sepiolite, attapulgite, bentonite, hectorite, and combinations thereof. Where the aqueous base is brine, the clay advantageously is selected from the group consisting of sepiolite and attapulgite. In one embodiment, the clay is sepiolite.

The clay assists in thickening the thermal insulation composition and lowering the free annular convection in the thermal insulation composition. In an advantageous embodiment, the clay is sepiolite clay. Sepiolite clay comprises a clay mineral with long, slender, needle-like structures, similar to attapulgite. Sepiolite clay comprises a mixture of fibrous and amorphous clay-like materials. Sepiolite has the general formula

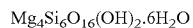

$$Mg_4Si_6O_{16}(OH)_2 \cdot 6H_2O$$

Suitable clays are available from a variety of commercial sources. Sepiolite is commercially available from ITC Minerals and Chemicals, located in Hunt Valley, Md.

In one embodiment, the fluid comprises about 429 kg/m$^3$ (150 lb/bbl) clay or less. In one embodiment, the fluid comprises about 357.2 kg/m$^3$(125 lb/bbl) clay or less. In one embodiment, the fluid comprises about 286 kg/m$^3$(100 lb/bbl) clay or less. In one embodiment, the fluid comprises about 143 kg/m$^3$(50 lb/bbl) clay or less. In one embodiment, the fluid comprises about 14.3 kg/m$^3$(5 lb/bbl) clay or more. In one embodiment, the fluid comprises about 28.6 kg/m$^3$(10 lb/bbl) clay or more. In one embodiment, the fluid comprises about 57 kg/m$^3$(20 lb/bbl) clay or more. In one embodiment, the fluid comprises about 86 kg/m$^3$(30 lb/bbl) clay or more.

Polymeric Viscosifier(s)

Although a number of polymeric viscosifiers are available, many polymeric viscosifiers do not remain homogeneous in solution for prolonged periods of time. A number of polymeric viscosifiers tend to form a top layer of water, which is undesirable.

In one embodiment, the polymeric viscosifier comprises monomers comprising an anionic moiety effective to maintain the polymeric viscosifier homogeneous in solution for a prolonged period of time in the presence of water and relatively high temperature differentials. In one embodiment, the anionic moiety is a sulfonic acid or sulfonate monomer.

The sulfonic acid/sulfonate monomer also may comprise polmerizable moiety, such as a vinyl alcohol moiety, an acrylate moiety, a pyrrolidone moiety, an acrylamide moiety, a styrene moiety, and combinations thereof. In an advantageous embodiment, the monomer comprises an acrylamide moiety. In one embodiment, the monomer comprises sulfonated acrylamide moiety. In one embodiment, the monomer comprises a sulfonated styrene acrylamide monomer.

In one embodiment, the sulfonate monomer has the following general structure:

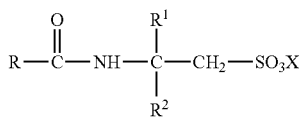

wherein R is selected from the group consisting of polymerizable alkenyl groups having from about 1 to about 4 carbon atoms; $R^1$ and $R^2$ are selected from the group consisting of hydrogen and methyl groups; and, X is a cation. In one embodiment, X is hydrogen. In one embodiment, the first water soluble polymer is 2-acrylamido-2-methylpropane sulfonic acid or alkali metal salt thereof ("AMPS"). Suitable AMPS is commercially available under the name KEM-SEAL® PLUS and PYRO-TROL®, trademarks of Baker Hughes Incorporated.

The mole percent of the various monomers will vary depending upon the monomers present and other factors. The embodiments described are illustrative only.

Where the polymeric viscosifier comprises copolymer comprising sulfonate monomer, the copolymer comprises less than 20 mole % sulfonate monomer. In another embodiment where the polymeric viscosifier is a copolymer of acrylamide monomer and sulfonate monomer, the copolymer comprises about 10 mole % or less sulfonate monomer. In an advantageous embodiment, the polymeric viscosifier is a copolymer of acrylamide monomer and about 10 mole % sulfonate monomer. In one embodiment, the sulfonate monomer is AMPS.

The thermal insulation composition generally comprises about 0.28 kg/m³ (0.1 lb/bbl) or more polymeric viscosifier. The thermal insulation composition generally comprises about 2.8 kg/m³ (1 lb/bbl) or more polymeric viscosifier. The thermal insulation composition generally comprises about 11 kg/m³ (3 lb/bbl) or more polymeric viscosifier. The thermal insulation composition generally comprises about 34 kg/m³ (12 lb/bbl) or less polymeric viscosifier. The thermal insulation composition generally comprises about 29 kg/m³ (10 lb/bbl) or less polymeric viscosifier. The thermal insulation composition generally comprises about 14.3 kg/m³ (5 lb/bbl) or less polymeric viscosifier. In one embodiment, the thermal insulation composition comprises from about 0.28 kg/m³ (0.1 lb/bbl) to about 35 kg/m³ (12 lb/bbl) polymeric viscosifier. In one embodiment, the thermal insulation composition comprises about 11.1 kg/m³ (3.9 lb/bbl) polymeric viscosifier.

Deflocculant

In one embodiment, the thermal insulation composition also comprises a high temperature deflocculant effective to prevent flocculation of the polymeric viscosifier. The deflocculant reduces the size of aggregates that form in the thermal insulation composition, thereby maintaining the thermal insulation composition substantially homogeneous over a prolonged period of time in the presence of water and upon exposure to temperature differentials.

In one embodiment, the deflocculant maintains the thermal insulation composition substantially homogeneous over period of 5 years or more. In one embodiment, the deflocculant maintains the thermal insulation composition substantially homogeneous over period of 7 years or more. In one embodiment, the deflocculant maintains the thermal insulation composition substantially homogeneous over period of 10 years or more.

A variety of deflocculants may be used. Suitable deflocculants generally comprise low-molecular weight anionic polymers. In one embodiment, the anionic polymers are other than polysaccharides and comprise one or more non-carboxylic-oyl groups. Suitable non-carboxylic-oyl groups are found, for example, in sulfonates, ketones, and combinations thereof.

In one embodiment, the water-soluble synthetic polymer comprises the reaction product of one or more monomer comprising sulfonate. In one embodiment, the water-soluble synthetic polymer comprises the reaction product of one or more cyclic ketone monomer. In one embodiment, the water-soluble synthetic polymer comprises the reaction product of one or more cyclic ketone monomer and monomer comprising one or more non-carboxylic-oyl group. In one embodiment, the water-soluble synthetic polymer comprises the reaction product of monomer comprising cyclic ketone monomer and monomer comprising sulfonate. In one embodiment, the water-soluble synthetic polymer comprises the reaction product of N-vinyl lactam monomer and monomer comprising sulfonate.

In one embodiment, the water-soluble synthetic polymer comprises the reaction product of monomer comprising cyclic ketone monomer and vinyl monomer. In one embodiment, the water-soluble synthetic polymer comprises the reaction product of monomer comprising cyclic diketene monomer and vinyl monomer. In one embodiment, the water-soluble synthetic polymer comprises the reaction product of monomer comprising cyclic diketene monomer and styrene monomer.

In one embodiment, the deflocculant is a terpolymer. Where the water-soluble synthetic polymer is terpolymer, suitable monomers include the foregoing as well as other polymerizable organic monomers. Examples of suitable other polymerizable organic monomers include those selected from the group consisting of vinyl alcohol monomers, acrylate monomers, pyrrolidone monomers, an acrylamide monomers, styrene monomers, and combinations thereof. In one embodiment, the polymerizable organic monomers are selected from the group consisting of acrylate monomers and acrylamide monomers.

In one embodiment, the water-soluble synthetic polymer comprises terpolymer comprising a reaction product of monomer comprising non-carboxylic-oyl group. In one embodiment, the water-soluble synthetic polymer comprises terpolymer comprising a reaction product of monomer comprising sulfonate. In one embodiment, the deflocculant is a terpolymer comprising a reaction product of: (a) acrylamide monomer; (b) 2-acrylamido-2-methylpropane sulfonic acid or alkali metal salts thereof ("AMPS"); and (c) acrylate monomer.

In one embodiment, the water-soluble synthetic polymer comprises terpolymer comprising a reaction product of cyclic ketone. In one embodiment, the water-soluble synthetic polymer comprises terpolymer comprising a reaction product of N-vinyl lactam monomer. In one embodiment, the water-soluble synthetic polymer comprises terpolymer comprising a reaction product of monomer comprising one or more ketone-oyl group and monomer comprising one or more different non-carboxylic-oyl group. In one embodiment, the water-soluble synthetic polymer comprises terpolymer comprising a reaction product of N-vinyl lactam monomer and one or more non-carboxylic, non-ketone-oyl group. In one embodiment, the water-soluble synthetic polymer comprises terpolymer comprising a reaction product of N-vinyl lactam monomer and one or more monomer comprising sulfonate.

The following are exemplary structures for the foregoing monomers:

Monomer Comprising Sulfonate

Examples of suitable monomer comprising sulfonate have the following general structure:

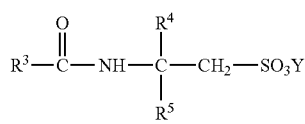

wherein $R^3$ is selected from the group consisting of polymerizable alkenyl groups having from about 2 to about 4 carbon atoms; $R^4$ and $R^5$ are selected from the group consisting of hydrogen and methyl groups; and, X is a cation. Suitable cations are selected from the group consisting of hydrogen and alkali metal. An advantageous cation is hydrogen. In one embodiment, $R^3$ is selected from the group consisting of polymerizable alkenyl groups having from about 2 to about 3 carbon atoms. In one embodiment, $R^3$ is a polymerizable alkenyl groups having 2 carbon atoms. In one embodiment, $R^4$ and $R^5$ are methyl groups.

A preferred monomer comprising sulfonate is 2-acrylamido-2-methylpropanesulfonic acid (AMPS), which has the following general structure:

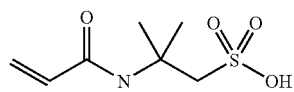

Cyclic Ketone Monomers

Examples of suitable cyclic ketone monomers have the following formula:

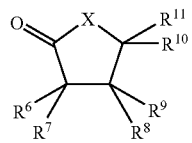

wherein
X is selected from the group consisting of oxygen and nitrogen, which may be unsubstituted or substituted;
$R^{11}$ is selected from the group consisting of hydrogen, a carbonyl group, and an alkyl group having from 1 to 4 carbon atoms; and,
$R^6, R^7, R^8$, and $R^9$ are selected from the group consisting of hydrogen and alkyl groups having 1 to 4 carbon atoms.

In one embodiment, X is oxygen. In one embodiment, X is nitrogen. Where X is substituted, suitable substituents comprise, for example 1-alkenyl groups having from 2 to 4 carbon atoms. In one embodiment, $R^{11}$ is an -oyl group. In one embodiment, $R^{11}$ is a hydrogen. In one embodiment, $R^6, R^7, R^8$, and $R^9$ is selected from the group consisting of methyl groups and hydrogen. In one embodiment, $R^6, R^7, R^8$, and $R^9$ are hydrogens.

-N-vinyl lactam monomer

In one embodiment, X is substituted nitrogen and the cyclic ketone comprises N-vinyl lactam monomer. Examples of suitable N-vinyl lactam monomer have the following general structure:

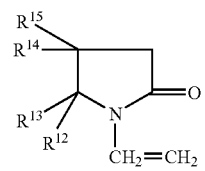

wherein $R^{12}, R^{13}, R^{14}$, and $R^{15}$ independently are selected from the group consisting of hydrogen, methyl groups, and ethyl groups. In one embodiment, $R^{12}, R^{13}, R^{14}$, and $R^{15}$ are the same. In one embodiment, the N-vinyl lactam monomer is N-vinyl-2-pyrrolidone (NVP), which is commercially available from a number of sources.

Cyclic Diketene Monomer

In one embodiment, the cyclic ketone monomer is a cyclic diketene monomer. Examples of suitable cyclic diketene monomers have the following general structure:

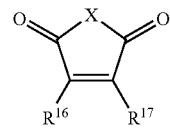

wherein X is selected from the group consisting of oxygen and nitrogen; and, $R^{16}$ and $R^{17}$ independently are selected from the group consisting of hydrogen and alkyl groups having from 1 to 4 carbon atoms. In one embodiment, X is oxygen. In one embodiment, $R^{16}$ and $R^{17}$ are selected from the group consisting of methyl groups and hydrogen. In one embodiment, $R^{16}$ and $R^{17}$ are hydrogen.

Styrene Monomer

In one embodiment, the deflocculant comprises the reaction product of the cyclic diketene monomer and styrene monomer. Examples of suitable styrene monomer have the following structure:

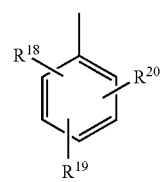

wherein $R^{18}, R^{19}$, and $R^{20}$ independently are selected from the group consisting of hydrogen and an alkyl groups. In one embodiment, $R^{18}, R^{19}$, and $R^{20}$ are selected from the group consisting of methyl groups and hydrogen. In one embodiment, $R^{18}, R^{19}$, and $R^{20}$ are hydrogens.

In one embodiment, the deflocculant is poly(styrene-co-maleic anhydride),which has the following general structure:

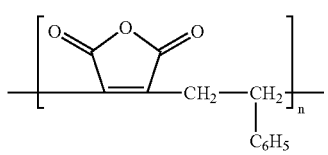

wherein n is sufficient to produce a copolymer having a number average molecular weight of about 500,000 to about 2,500,000. Poly(styrene-co-maleic anhydride) is commercially available from a variety of sources. A suitable copolymer is commercially available from Baker Hughes Incorporated under the name MIL-TEMP®.

The Acrylate Monomer

In one embodiment, the terpolymer further comprises the reaction product of acrylate monomer. Examples of suitable acrylate monomers have the following general structure:

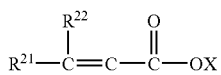

wherein $R^{22}$ and $R^{23}$ independently are selected from the group consisting of hydrogen and alkyl groups having from about 1 to about 4 carbon atoms; $R^{21}$ is selected from the group consisting of hydrogen, alkyl groups having from about 1 to about 4 carbon atoms, and groups that activate the unsaturated carbon-carbon bond; and X is selected from the group consisting of hydrogen and alkali metal. In one embodiment, X is selected from the group consisting of hydrogen and sodium. In one embodiment, X is hydrogen. Examples of groups that activate the unsaturated carbon-carbon bond include, for example, groups comprising nitrogen, phosphorus, and sulfur.

Acrylamide Monomer

In one embodiment, the terpolymer comprises the reaction product of acrylamide monomer. Examples of suitable acrylamide monomers have the following general structure:

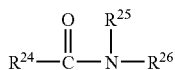

wherein $R^{24}$ is a 1-alkenyl group having from 2 to 4 carbon atoms and $R^{25}$ and $R^{26}$ independently are selected from the group consisting of hydrogen and alkyl groups having from 1 to 4 carbon atoms. In one embodiment, $R^{25}$ and $R^{26}$ are selected from the group consisting of hydrogen and methyl groups.

The mole percent of the various monomers will vary depending upon the monomers present and other factors. The embodiments described are illustrative only.

Where the deflocculant is a copolymer of acrylamide monomer and sulfonate monomer, the copolymer comprises less than 20 mole % sulfonate monomer. In another embodiment where the water soluble polymer is a copolymer of acrylamide monomer and sulfonate monomer, the copolymer comprises about 10 mole % or less sulfonate monomer. In an advantageous embodiment, where the water soluble polymer is a copolymer of acrylamide monomer and sulfonate monomer. In one embodiment, the water soluble polymer is a copolymer of acrylamide monomer and about 10 mole % sulfonate monomer. In one embodiment, the sulfonate monomer is ANPS.

Where the deflocculant is a terpolymer of acrylamide monomer/sulfonate monomer/N-vinyl lactam monomer, the mole percent of acrylamide monomer is from about 10 mole % to about 20 mole %; the mole percent of sulfonate monomer is from about 50 mole % to about 60 mole %; and, the mole percent of N-vinyl lactam monomer is from about 25 mole % to about 35 mole %. In one embodiment, the mole percent of acrylamide monomer is from about 15 mole % to about 50 mole %; the mole percent of sulfonate monomer is from about 37.5 mole % to about 55 mole %; and, the mole percent of N-vinyl lactam monomer is from about 12.5 mole % to about 30 mole %. In one embodiment having the foregoing percentage composition, the N-vinyl lactam monomer is N-vinyl pyrrolidone (NVP).

In one embodiment, the deflocculant is a terpolymer having a mole ratio of 55:30:15 of AMPS:NVP:acrylamide. In another embodiment, the water soluble polymer is a terpolymer having a mole ratio of 50:37.5:12.5 of acrylamide:AMPS:acrylate. Suitable terpolymers include, for example, ALL-TEMP®, which is commercially available from Baker Hughes Incorporated.

The polymeric viscosifier and the deflocculant may be made by any suitable method include, for example, the bead method and the spray dried powder method.

Suitable polymeric viscosifiers and deflocculants generally have a 5% by weight Brookfield viscosity in freshwater of from 50 cP to 100 cP. Generally, water soluble polymers meeting this viscosity have a number average molecular weight of from about 500,000 to about 2,500,000. In one embodiment, the water soluble polymer has a number average molecular weight of from about 750,000 to about 1,500,000.

The thermal insulation composition generally comprises about 0.28 kg/m³ (0.1 lb/bbl) or more deflocculant. The thermal insulation composition generally comprises about 1.14 kg/m³ (0.4 lb/bbl) or more deflocculant. The thermal insulation composition generally comprises about 1.43 kg/m³ (0.5 lb/bbl) or more deflocculant. The thermal insulation composition generally comprises about 14.3 kg/M³ (5 lb/bbl) or less deflocculant. The thermal insulation composition generally comprises about 5.72 kg/M³ (2 lb/bbl) or less deflocculant. The thermal insulation composition generally comprises about 2.86 kg/M³ (1 lb/bbl) or less deflocculant. In one embodiment, the thermal insulation composition comprises from about 0.28 kg/m³ (0.1 lb/bbl) to about 14.3 kg/M³ (5 lb/bbl) deflocculant. In one embodiment, the thermal insulation composition comprises about 2.14 kg/m³ (0.75 lb/bbl) deflocculant.

Polyol Composition

The thermal insulation composition further comprises one or more polyol composition. The polyol composition generally acts as a solvent. The polyol composition assists in keeping the polymer viscosifier dispersed in the thermal insulation composition and prevents the polymer viscosifier from decomposing while being subjected to the extreme conditions produced in deep wellbores. In addition, the polyol composition reduces the thermal conductivity of the thermal insulation composition. In an advantageous embodiment, the polyol composition also reduces the density of the fluid.

Suitable polyol compositions comprise polyols selected from the group consisting of glycols, glycerol, polyglycols, and combinations thereof.

Suitable glycols include, for example, ethylene glycol, propylene glycol, butylene glycol, polymeric polyols, and combinations thereof. In one embodiment, the glycol is selected from the group consisting of ethylene glycol, propylene glycol, butylene glycol, and combinations thereof. In an advantageous embodiment, which also tends to reduce fluid density, the glycol comprises propylene glycol.

Suitable polymeric polyols include, for example, polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers.

A wide variety of polyglycols are commercially available. Most commercially available polyglycols are designated by a number that roughly corresponds to the number average molecular weight. Examples of useful commercially available polyethylene glycols include polyethylene glycol 4000 and polyethylene glycol 6000. If polymeric polyol is used, the polymeric polyol suitably has a number average molecular weight, $M_n$, of about 150 to about 18,000 Daltons. In one embodiment, the polymeric polyols have number average molecular weight of about 190 to about 10,000 D. In one embodiment, the polymeric polyols have number average molecular weight of about 500 to about 8,000 D.

In one embodiment, the polyol composition comprises glycerol. In one embodiment, the polyol composition comprises a combination of glycol and glycerol. In one embodiment, the polyol composition comprises a combination of propylene glycol and glycerol.

In one embodiment, the thermal insulation composition does not comprise polyol composition. In one embodiment, the thermal insulation composition does comprise polyol composition. Where the thermal insulation composition does comprise polyol composition, the thermal insulation composition generally comprises about 90 vol. % or less of one or more of the polyol composition. In one embodiment, the thermal insulation composition comprises from about 0.1 vol. % to about 90 vol. % polyol composition. In an advantageous embodiment, the thermal insulation composition comprises about 60 vol. % polyol composition. In one embodiment, the polyol composition comprises about 95 vol. % glycol and about 5 vol. % glycerol, based on the total volume of polyol composition.

Other Components

The thermal insulation composition may further comprise one or more inorganic salt, buffer, biocide, corrosion inhibitor, crosslinking agent, or other component which does not interfere with the stability of the homogeneous thermal insulation composition.

Method of Preparation

In one embodiment, the thermal insulation composition is prepared, for example, as follows. To make one bbl of the thermal insulation composition, add 85.7 kg/m³ (30.0 lb/bbl) of sepiolite 43.76 liter (0.367 bbl) of water and agitate the mixture for a period of 15 minutes using a Prince Castle mixer at about 10,000 rpm. After mixing, add 2.1 kg/M³ (0.75 lb/bbl) of MIL TEMP® and agitate the resulting mixture for an additional 15 minutes. Add 8.6 kg/m³ (3.0 lb/bbl) of KEM-SEAL® PLUS to the mixture and mix for another 15 minutes. After sufficient mixing, 1.9 kg/m³ (0.57 ppb) of propylene glycol was added followed by 0.09 kg/m³ (0.03 lb/bbl) of glycerol and then mixed for a final 15 minutes.

The thermal insulation composition will be better understood with reference to the examples, which are illustrative only:

EXAMPLES

In the following examples, the thermal insulating composition had a density of 9.0 lb/gal. The thermal insulating composition had the following composition:

| COMPONENT | AMOUNT |
|---|---|
| Water | 1.1 kg/m³ (0.367 bbl) |
| Sepiolite | 85.7 kg/m³ (30.0 lb/bbl) |
| MIL-TEMP ® | 2.1 kg/m³ (0.75 lb/bbl) |
| KEM-SEAL ® PLUS | 11.1 kg/m³ (3.9 lb/bbl) |
| Propylene glycol | 1.6 kg/m³ (0.57 bbl) |
| Glycerol | 0.09 kg/m³ (0.03 bbl) |

Tests were performed to determine the ability of the thermal insulation composition to maintain good rheological properties over time when exposed to 93.3° C.(200° F.) and 148.9° C.(300° F.), and the thermal insulation properties were measured (thermal conductivity and convective heat transfer coefficient).

The following were the test procedures:
Test Procedures

Initial Fluid Properties—After mixing, the initial properties of the thermal insulation composition were measured, including the Fann 35 rheological profile at temperatures of 4.4° C. (40° F.), 26.7° C.(80° F.), 65.6° C.(150° F.), and 79.4° C.(175° F.); the mud weight; the pH; the alkalinity; the level of chlorides; the level of calcium; and, the API filtrate.

Temperature/Pressure Profile—Using a Fann 70 viscometer, the low-temperature rheological profile of the thermal insulation composition was measured at: temperatures of 4.4° C. (40° F.) and 21.1° C. (70° F.); pressures of 0 MPa (0 psi) and 34.5 MPa (5000 psi). The high-temperature Theological profile was measured at temperatures of 48.9° C.(120° F.), 79.4° C.(175° F.) and 93.3° C.(200° F.), with pressures of 0 MPa (0 psi) and 34.5 MPa (5000 psi). Ten second and ten minute gels were measured at each temperature/pressure, and yield stress was calculated.

Low-shear Viscosity Tests (OFI Model 900)—The rheological profile of the thermal insulation composition was measured at temperatures of 4.4° C. (40° F.) and 65.6° C. (150° F.). The viscosity of the thermal insulation composition was measured at shear rates of from 600 rpm to 0.01 rpm, and the centipoise (cP) was calculated.

93.3° C.(200° F.) Static-age Testing—The thermal insulation composition was statically aged for 1, 14, and 28 days at 93.3° C.(200° F.), with 3 MPa (300 psi) nitrogen pressure. After static-aging, Fann 35 rheological properties were measured at 4.4° C. (40° F.) and 65.6° C. (150° F.). Separation of the thermal insulation composition in the static-aging cell was noted and free liquid was measured. Test tubes filled with the thermal insulation composition were placed in a second static-aging cell and static-age at 93.3° C.(200° F.) for 1, 14, and 28 days. The test tubes were photographed.

148.9° C.(300° F.) Static-age Testing—The thermal insulation composition was static-aged for 1, 14, and 28 days at 148.9° C.(300° F.), with 3 MPa(300 psi) nitrogen pressure. After static-aging, Fann 35 rheological properties were measured at 4.4° C. (40° F.) and 65.6° C. (150° F.). Separation of the thermal insulation composition in the static-aging cell was noted and free liquid was measured. Test tubes filled with insulation fluid were placed in a second static-aging cell and static-aged at 148.9° C.(300° F.) for 1, 14, and 28 days. The test tubes were photographed.

121.1° C.(250° F.) and 132.2° C.(270° F.) Static-age Testing—The thermal insulation composition was static-aged for 14 days at 121.1° C.(250° F.) and 132.2° C.(270° F.), with 3 MPa (300 psi) nitrogen pressure. After static-aging, Fann 35 rheological properties were measured at 4.4° C. (40° F.) and 65.6° C. (150° F.). Separation of the thermal insulation composition in the static-aging cell was noted and free liquid was measured. Test tubes filled with the thermal insulation composition were placed in a second static-aging cell and static-aged at 121.1° C.(250° F.) and 132.2° C.(270° F.) for 14 days. The test tubes were photographed.

93.3° C.(200° F.) and 148.9° C.(300° F.) Cycling tests—The thermal insulation composition alternately was static-aged in bombs and test tubes for three days at 4.4° C. (40° F.) and three days at 93.3° C.(200° F.) for 24 days (four cooling/heating cycles). The thermal insulation composition simultaneously was static-aged in bombs and test tubes alternately for three days at 4.4° C. (40° F.) and three days at 148.9° C.(300° F.) for 24 days. At the conclusion of the 24-day cycle, Fann 35 testing was conducted at temperatures of 4.4° C. (40° F.) and 65.6° C. (150° F.). Separation in the static-aging cells was measured and the test tubes were photographed.

pH reduction testing—The pH of the thermal insulation composition was reduced to 7.0, using 0.1 normal hydrochloric acid. The reduced-pH thermal insulation composition was static-age for 72 hours at 93.3° C.(200° F.). Fann 35 testing was performed at temperatures of 4.4° C. (40° F.) and 65.6° C. (150° F.). Separation in the test cells was measured.

Thermal Conductivity Testing—The thermal conductivity of the thermal insulation composition was measured at 4.4° C. (40° F.) and 93.3° C. (200° F.). The testing was conducted as described in procedure ASTM D 2717-95, "Standard Test Method for Thermal Conductivity of Liquids," incorporated herein by reference. The test data was reported in watts per meter degree centigrade (W/m-° C.).

Convective Heat Transfer Coefficient—The convective heat transfer coefficient of the thermal insulation compositions was measured using the Westport Wellbore Model Insulation Fluid tester at the Intertek Westport Technology Center, Houston, Tex.

Referring again to FIG. 1, the test cell 10 generally comprised a bore 12 defined by an internal pipe 14, which fitted concentrically within a second pipe 16, forming an inner annulus 18. The second pipe 16 fitted concentrically within a third pipe 20, forming an outer annulus 22. The test cell 10 had a height 16 of 26.75 inches. The internal diameter of the pipe 20 forming the outer annulus 22 was of 4.716 inches, and the internal pipe 14 had an outer diameter of 1.90 inches. The internal pipe 14 was aluminum, and was used to flow hot-water through the testing device. The volume of the test cell 10 was 6.42 liters. Surrounding the test cell 10 was a water jacket for flowing cold water.

A first set of three thermocouples were placed 6.68 inches from the bottom 31 of the test cell 10. The inside thermocouple 24 of the first set was mounted 0.352 inches from the internal pipe 14. The middle thermocouple 26 of the first set was placed 0.704 inches from the internal pipe 14 and 0.704 inches from the second pipe 16. The third thermocouple 28 of the first set was mounted 1.056 inches from the internal pipe 14 and 0.352 inches from the second pipe 16. A combination heat flux sensor/thermocouple 30, 31 was mounted directly opposite the thermocouples 24, 26, 28 on the internal pipe 14. The heat flux sensor measurements were equivalent to 6.5 microvolts=1 BTU/ft$^2$–hr.

A second set of three thermocouples 24a, 26a, and 28a and a combination heat flux sensor/thermocouple 30a, 31a were mounted 6.68 inches above the first set of thermocouples and at a 120° angle along the circumference of the test cell 10 relative to the first set of thermocouples. See FIG. 1a. The second set of thermocouples 24a, 26a, and 28a were mounted at substantially the same distances from the various pipes as the first set of thermocouples.

A third set of thermocouples 24b, 26c, 28c, and combination heat flux sensor/thermocouple 30c, 31c were mounted 6.68 inches above the second set of thermocouples, 6.68 inches below the top 33 of the test cell 10, and at a 120° angle along the circumference of the test cell 10 relative to the second set of thermocouples. The third set of thermocouples also was at a 120° angle along the circumference of the test cell 10 relative to the first set of thermocouples. See FIG. 1a. The third set of thermocouples 24c, 26c, and 28c were mounted at substantially the same distances from the various pipes as the first set and the second set of thermocouples.

Using a Digital Multimeter Model 34405A recorder obtained from Agilent Technologies, the thermocouple readings (nine channels—24, 26, 28 (a,b,and c) and heat flux sensor readings [six channels—30 and 31 (a,b, and ,c)] were recorded. Hot water was pumped through the bore 12. The temperature of the hot water was measured at or near the inlet into the bore, and the temperature of water leaving the bore was measured at or near the outlet from the bore. Flow meters measured the volume of cold water and hot water pumped through the test cell.

The thermal insulation composition was transferred into the outer annulus 22 of the test cell 10 using a peristaltic pump. After the outer annulus 22 of the test cell 10 was full, cold water was circulated through the water jacket using a second pump. Seven gallons per minute of 3.3° C.(38° F.) water was flowed through the water jacket during the test. The cold water in the water jacket cooled the outer wall of the third pipe 20. When the thermal insulation composition was cooled to 4.4° C.(40° F.), hot water 60° C.(140° F.) was flowed through the bore 12 to begin heating the thermal insulation composition. Both hot water and cold water were pumped through the test device for approximately 12 to 16 hours, and thermocouple and heat flux sensor readings were taken every ten seconds.

Calculation of Heat Transfer Coefficient

The overall heat-transfer coefficient (U) was calculated using the formula:

$$U = Q/A(\Delta T)$$

where U was in BTU/hr ft$^2$° F. (or W/m$^2$° C.); Q was the heat rate (BTU/hr); A was the surface area of the test cell 10, and, Δ T was the temperature differential. Note that Q/A was heat flux. In the test cell 10, heat flux (BTU/hr ft$^2$) and temperature differentials were measured. The measured temperature differential was the average temperature recorded by thermocouples 28a, 28b, and 28c subtracted from the average temperature recorded by the respective heat flux sensor/thermocouple readings (30a, 30b, and 30c; 31a, 31b, and 31c, respectively). By dividing the heat flux by the temperature differential, the overall heat-transfer coefficient was determined.

Test data was measured for 23 hours. Test data values were averaged from 12 hours to 23 hours. The calculated heat-transfer coefficients for the first set of thermocouples 24a, 26a, 28a (lower), the second set of thermocouples 24b, 26b, 26b (medium), the third set of thermocouples 24c, 26c, 28c (upper), and the heat flux sensor/thermocouple data were averaged to determine the overall heat-transfer coefficient for the test. The heat-transfer coefficient for the thermal insulation composition was compared to a control using fresh water in place of the thermal insulating composition.

Example 1

FANN 35 testing was performed using the thermal insulation composition. The results are shown in the following Table:

| | Fann 35 Test Temperature, °F. | | | |
|---|---|---|---|---|
| | 4.4° C. (40° F.) | 26.7° C. (80° F.) | 65.6° C. (150° F.) | 79.4° C. (175° F.) |
| Mud weight, lb/gal | — | 9.1 | — | — |
| 600 rpm | 300+ | 209 | 127 | 105 |
| 300 rpm | 266 | 139 | 86 | 74 |
| 200 rpm | 205 | 110 | 67 | 60 |
| 100 rpm | 132 | 73 | 46 | 44 |
| 6 rpm | 24 | 16 | 12 | 12 |
| 3 rpm | 18 | 12 | 10 | 13 |
| Plastic Viscosity, cP | — | 70 | 41 | 31 |
| Yield Point, kg/m² (lb/100 ft²) | — | 3.3 (69) | 2.2 (45) | 2.1 (43) |
| Gels, 10 sec/10 min. | 17/24 | 13/20 | 12/24 | 17/34 |
| Yield Stress, kg/m² (lb/100 ft²) | 0.6(12) | 0.4(8) | 0.4(8) | 0.7(14) |
| pH | — | 9.60 | — | — |
| API filtrate, mL/30 min. | — | 1.4 | — | — |
| Pf/Mf | — | 0/0.5 | — | — |
| Pm | — | 0.7 | — | — |
| Chlorides, mg/L | — | 500 | — | — |
| Calcium, mg/L | — | trace | — | — |

The yield point value dropped from 11.8 kg/100 m² (241 lb/100 ft²) at 4.4° C. (40° F.) to 2.1 kg/100 m² (43 lb/100 ft² at 79.4° C.(175° F.), representing a loss of approximately 82% of yield point value when the thermal insulation composition was heated. However, the loss in yield point was mostly limited to a temperatures of from 4.4° C.(40° F.) to 26.7° C.(80° F.), dropping from 241 lb/100 ft² to 69 lb/100 ft², respectively. Initial and ten minute gel strengths were progressive, with an almost constant ten minute gel strength [24 lb/100 ft² at 4.4° C. (40° F.) and 34 lb/100 ft² at 79.4° C.(175° F.)]. No reduction was seen in yield stress values at these temperatures.

Example 2

Figure 2:
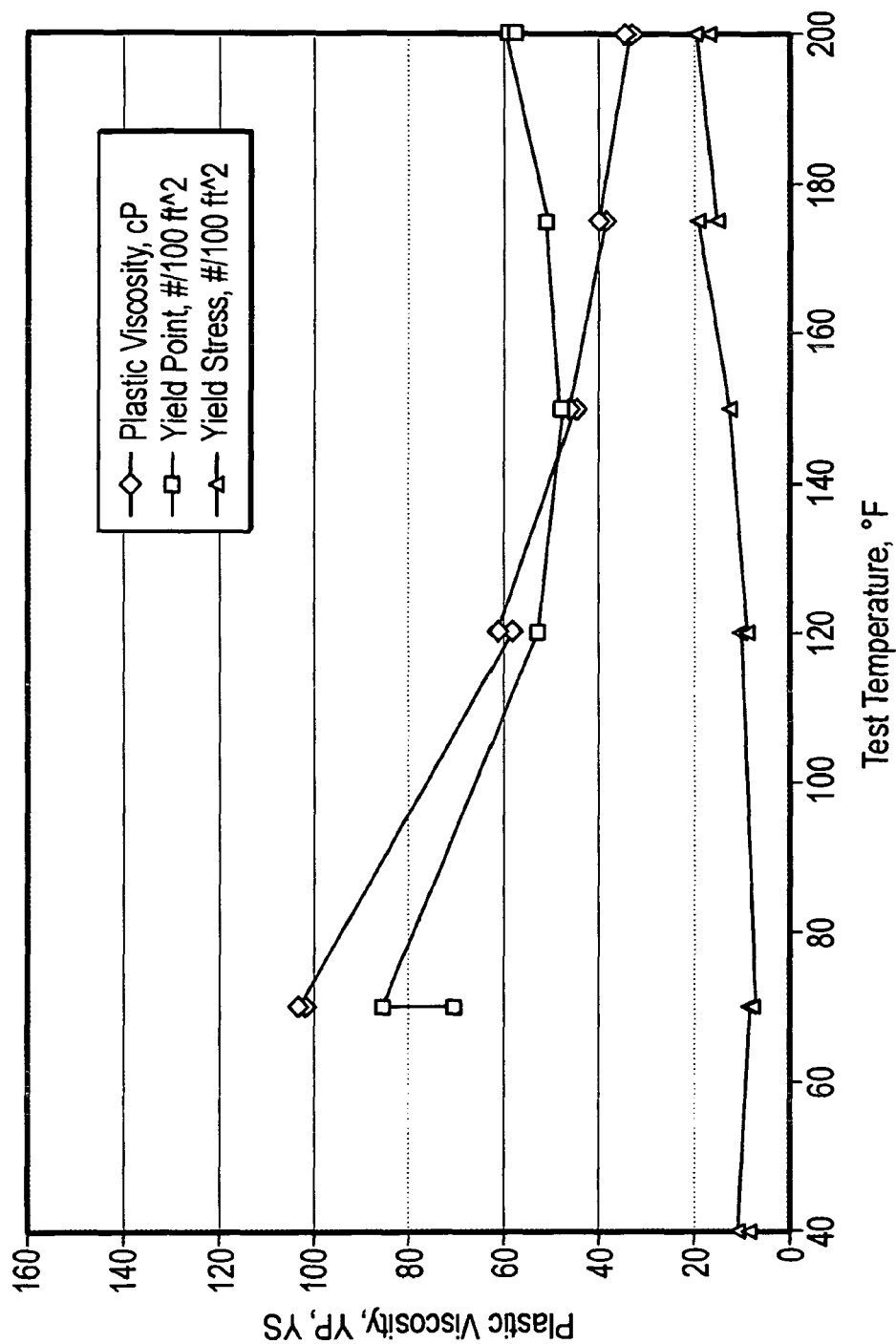
FIG. 2 is a chart of the Fann 70 Test Results for the thermal insulating composition of Example 2.

FANN 70 testing was performed using the thermal insulating fluid. The results are shown in the following Table, and in FIG. 2:

The thermal insulation composition showed very good rheological stability, when tested at from 4.4° C.(40° F.) at 0 MPa (0 psi) to 93.3° C.(200° F.) at 34.5 Mpa (5000 psi). The plastic viscosity and yield point of the thermal insulation composition could not be measured until the temperature of the fluid was increased to 21.1° C.(70° F.), but at this temperature, the yield point was 70 lb/100 ft² at 0 MPa (0 psi), gradually decreasing to 58 lb/100 ft² at 93.3° C.(200° F.) and 34.5 MPa (5000 psi). Pressure increases at the given temperatures had very little effect on this 9.0 lb/gal fluid. The yield stress was increased from 8.2 lb/100 ft² at from 4.4° C.(40° F.) to 17.2 lb/100 ft² at 93.3° C.(200° F.). Gel strengths showed a progressive increase with increasing temperature. At 4.4° C.(40° F.), the fluid gel strengths were 17 and 20 (ten second, ten minute respectively). At 93.3° C.(200° F.), the gel strengths had increased to 32 and 69.

Example 3

OFI Model 900 low shear rate testing was performed using the thermal insulating fluid. The results are shown in the following Table:

| | Temperature, °C.(°F.) | | | |
|---|---|---|---|---|
| | | | Viscosity, cp | |
| | 4.4° C. (40° F.) | 65.6° C. (150° F.) | 4.4° C. (40° F.) | 65.6° C. (150° F.) |
| 600 rpm | 334.7 | 93.6 | 167.4 | 46.8 |
| 300 rpm | 241.1 | 64.1 | 241.1 | 64.1 |
| 200 rpm | 187.6 | 49.7 | 281.4 | 74.55 |
| 100 rmp | 120.3 | 36.3 | 360.9 | 108.9 |
| 60 rmp | 87.7 | 25.1 | 438.5 | 125.5 |
| 30 rmp | 57.8 | 18.1 | 578 | 181 |

| | Fann 70 Test Temp. °C. (°F.) | | | | | | | | | | | |
|---|---|---|---|---|---|---|---|---|---|---|---|---|
| | 4.4° C. (40° F.) | 4.4° C. (40° F.) | 21.1° C. (70° F.) | 21.1° C. (70° F.) | 48.9° C. (120° F.) | 48.9° C. (120° F.) | 65.6° C. (150° F.) | 65.6° C. (150° F.) | 79.4° C. (175° F.) | 79.4° C. (175° F.) | 93.3° C. (200° F.) | 93.3° C. (200° F.) |
| | Pressure, psi | | | | | | | | | | | |
| | 0 | 5000 | 0 | 5000 | 0 | 5000 | 0 | 5000 | 0 | 5000 | 0 | 5000 |
| 600 rpm | 300+ | 300+ | 274.8 | 291.6 | 169.7 | 175.6 | 138 | 141 | 129.1 | 131.1 | 126.1 | 128.1 |
| 300 rpm | 300+ | 300+ | 172.7 | 188.5 | 111.3 | 114.2 | 92.8 | 94.6 | 90.1 | 91 | 92.8 | 92.8 |
| 200 rpm | 213.9 | 221.1 | 134 | 145.9 | 88.3 | 91 | 76.5 | 77.4 | 77.9 | 77.4 | 81.1 | 82.9 |
| 100 rpm | 135.5 | 141 | 88.3 | 94.6 | 57.5 | 59.3 | 52.1 | 52.1 | 56.6 | 54.8 | 63.9 | 64.8 |
| 6 rpm | 24.5 | 25.5 | 17.2 | 18.1 | 11.8 | 12.7 | 14.5 | 14.5 | 20.9 | 20.9 | 27.8 | 26.4 |
| 3 rpm | 16.3 | 18.1 | 12.7 | 12.7 | 10.9 | 10.9 | 13.6 | 13.6 | 19.9 | 18.1 | 23.6 | 21.8 |
| Plastic Viscosity, cP | — | — | 102.1 | 103.1 | 58.4 | 61.4 | 45.2 | 46.4 | 39 | 40.1 | 33.3 | 35.3 |
| Yield Point, kg/m² (lb/100 ft²) | — | — | 5 (70.6) | 4.2 (85.4) | 2.6 (52.9) | 2.6 (52.8) | 2.3 (47.6) | 2.4 (48.2) | 2.5 (51.1) | 2.5 (50.9) | 2.9 (59.5) | 2.8 (57.5) |
| Gels, 10 sec/10 min. | 17/20 | 18/23 | 13/15 | 14/17 | 11/17 | 11/18 | 15/34 | 15/35 | 21/47 | 20/45 | 28/70 | 32/69 |
| Yield Stress, kg/m² (lb/100 ft²) | 0.4 (8.1) | 0.5 (10.7) | 0.4 (8.2) | 0.4 (7.3) | 0.5 (10) | 0.4 (9.1) | 0.6 (12.7) | 0.6 (12.7) | 0.9 (18.9) | 0.7 (15.3) | 1 (19.4) | 0.8 (17.2 |

-continued

| | Temperature, °C.(° F.) | | | |
|---|---|---|---|---|
| | | | Viscosity, cp | |
| | 4.4° C. (40° F.) | 65.6° C. (150° F.) | 4.4° C. (40° F.) | 65.6° C. (150° F.) |
| 6 rmp | 24.3 | 12.1 | 1215 | 605 |
| 3 rmp | 17.2 | 10.3 | 1720 | 1030 |
| 1 rpm | 7.1 | 6.1 | 2130 | 1830 |
| 0.6 rpm | 6.5 | 5.7 | 3250 | 2850 |
| 0.3 rpm | 5.9 | 5.6 | 5900 | 5600 |
| 0.2 rpm | 5.7 | 5.6 | 8550 | 8400 |
| 0.1 rpm | 5.3 | 5.5 | 15900 | 16500 |
| 0.06 rpm | 4.9 | 5.5 | 24500 | 27500 |
| 0.03 rpm | 4.3 | 5.5 | 43000 | 55000 |
| 0.01 rpm | 3.7 | 5.4 | 111000 | 162000 |
| Plastic Viscosity, cP | 93.6 | 29.5 | — | — |
| Yield Point, $kg/m^2$ ($lb/100\ ft^2$) | 7.2 (147.5) | 1.7 (34.6) | — | — |
| Gels, 10 sec/10 min. | 17/19.3 | 10.6/18.8 | — | — |
| Yield Stress, $\#/100\ ft^2$ | 10.1 | 8.5 | — | — |

Figure 3:
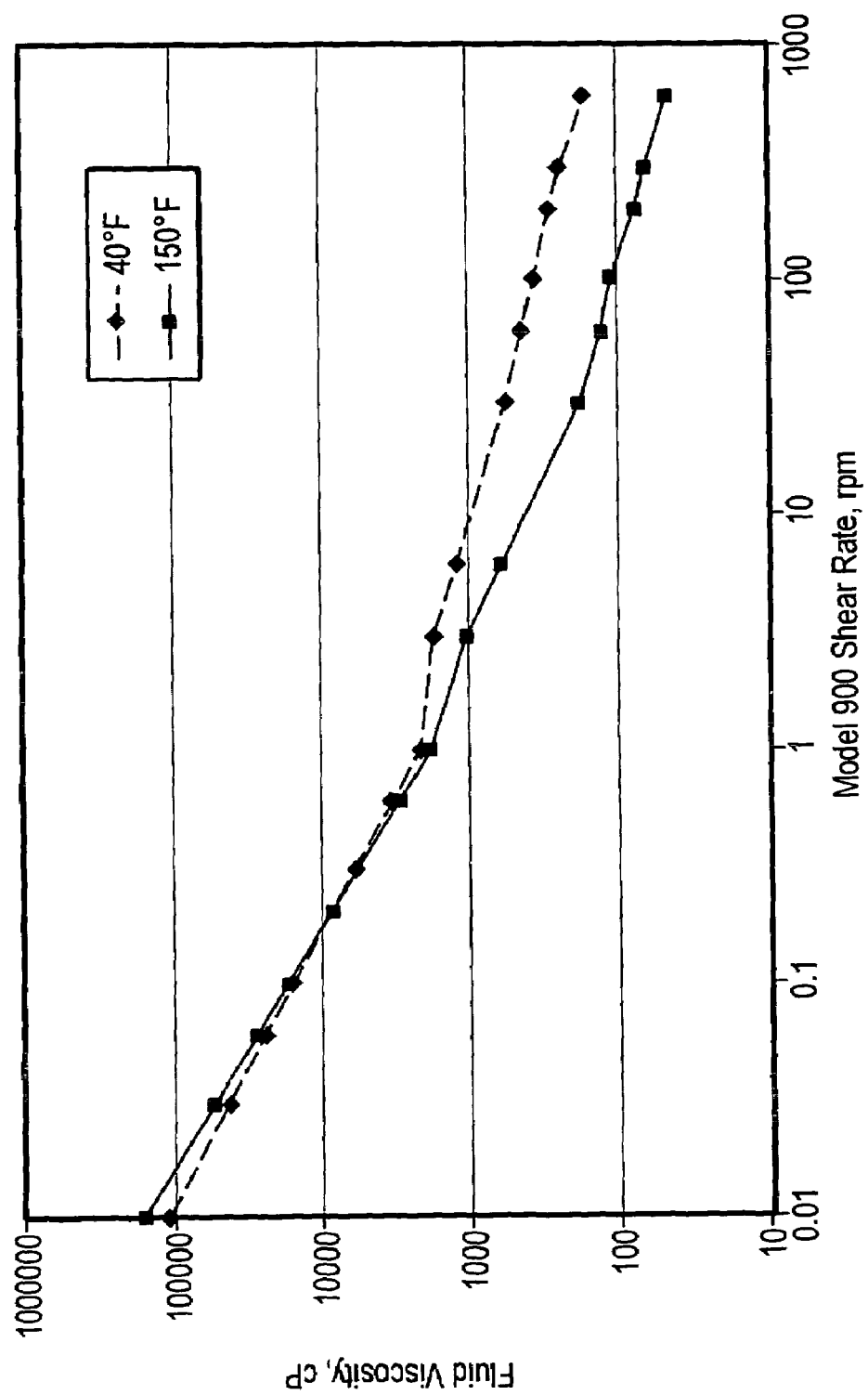
FIG. 3 is a chart of the "Model 900" test results [600 rpm to 0.01 rpm, 4.4° C.(40° F.) and 65.6° C.(150° F.)] for the thermal insulating composition of Example 3.

When measured at 4.4° C.(40° F.), the thermal insulation composition had moderately-high (and temperature-stable) shear stress values at low shear rate speeds. For example, at 0.1 rpm, the fluid had a dial reading of 5.3, which calculates to a viscosity of 15,900 centipoise (cP). When heated to 65.6° C.(150° F.), the 0.1 rpm dial reading was 5.5, which calculates to a viscosity of 16,500 cP. FIG. 3 shows that the shear rates at different temperatures are very consistent at 1 rpm and lower.

Example 4

Figure 4:
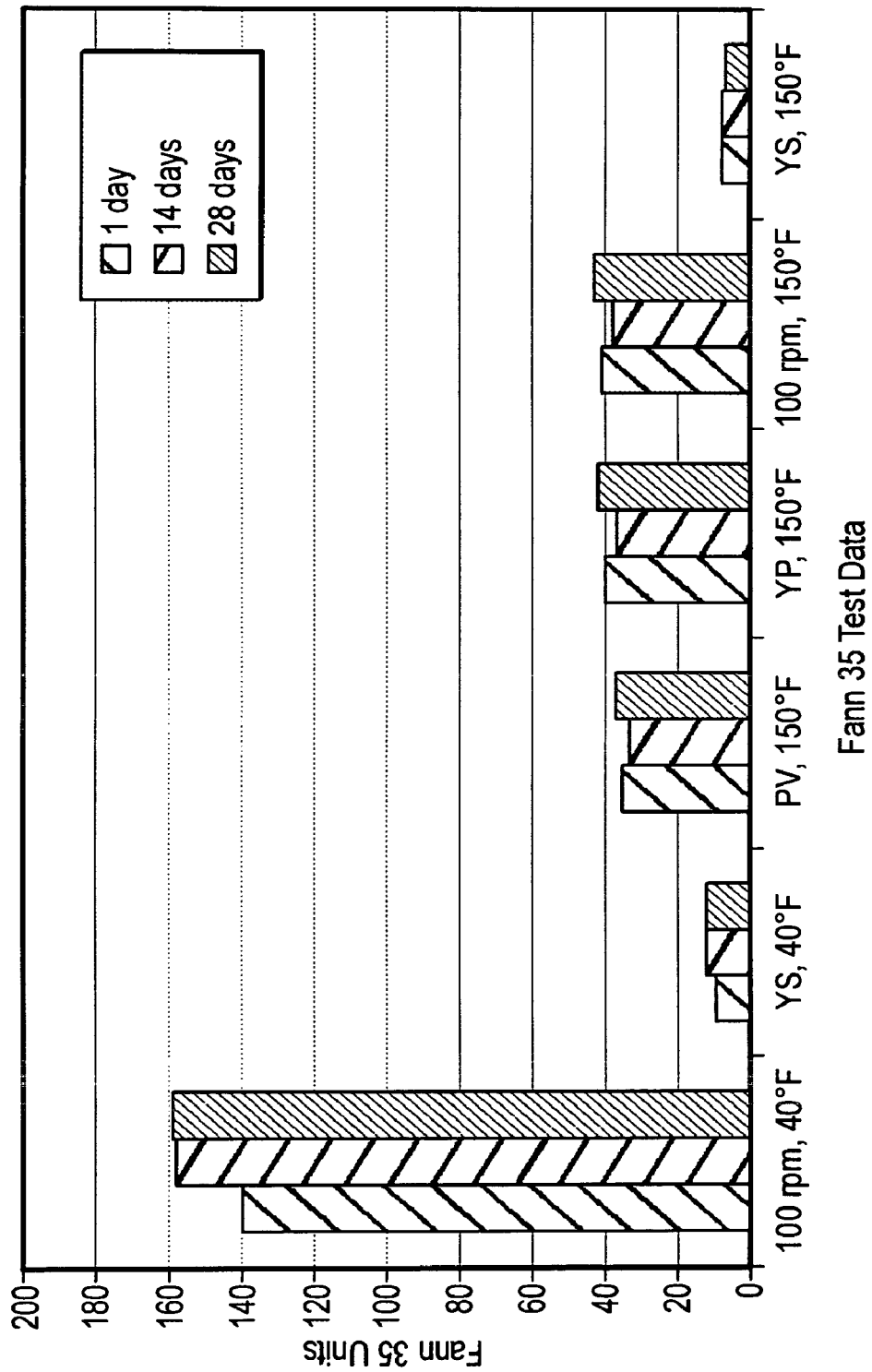
FIG. 4 is a chart of the Fann 35 Test Results [93.3° C.(200° F.) Static-Aging] for the thermal insulating composition of Example 4.

Static aging tests were performed on the thermal insulating composition for 1, 14, and 28 days at 93.3° C. (200° F.). The results are shown in following Table, and illustrated in FIG. 4.

The thermal insulation composition was extremely stable when static-aged from 1 through 28 days at 93.3° C. (200° F.). After static-aging, Fann 35 readings at 4.4° C. (40° F.) were too high to calculate plastic viscosity and yield points. At 100 rpm, the readings were consistent between 1 and 28 days. Yield stress values were also very consistent.

At 65.6° C.(150° F.), Fann 35 tests showed very stable drilling fluid properties. Although the measured properties were lower than at 4.4° C. (40° F.), the static-age time period had no effect on plastic viscosity, yield point, gels, or yield stress.

There was no observed separation or settling in the static-aging cells. Test tube photographs after static-aging at 93.3° C.(200° F.) showed no changes in the appearance of the fluid.

Example 5

Figure 5:
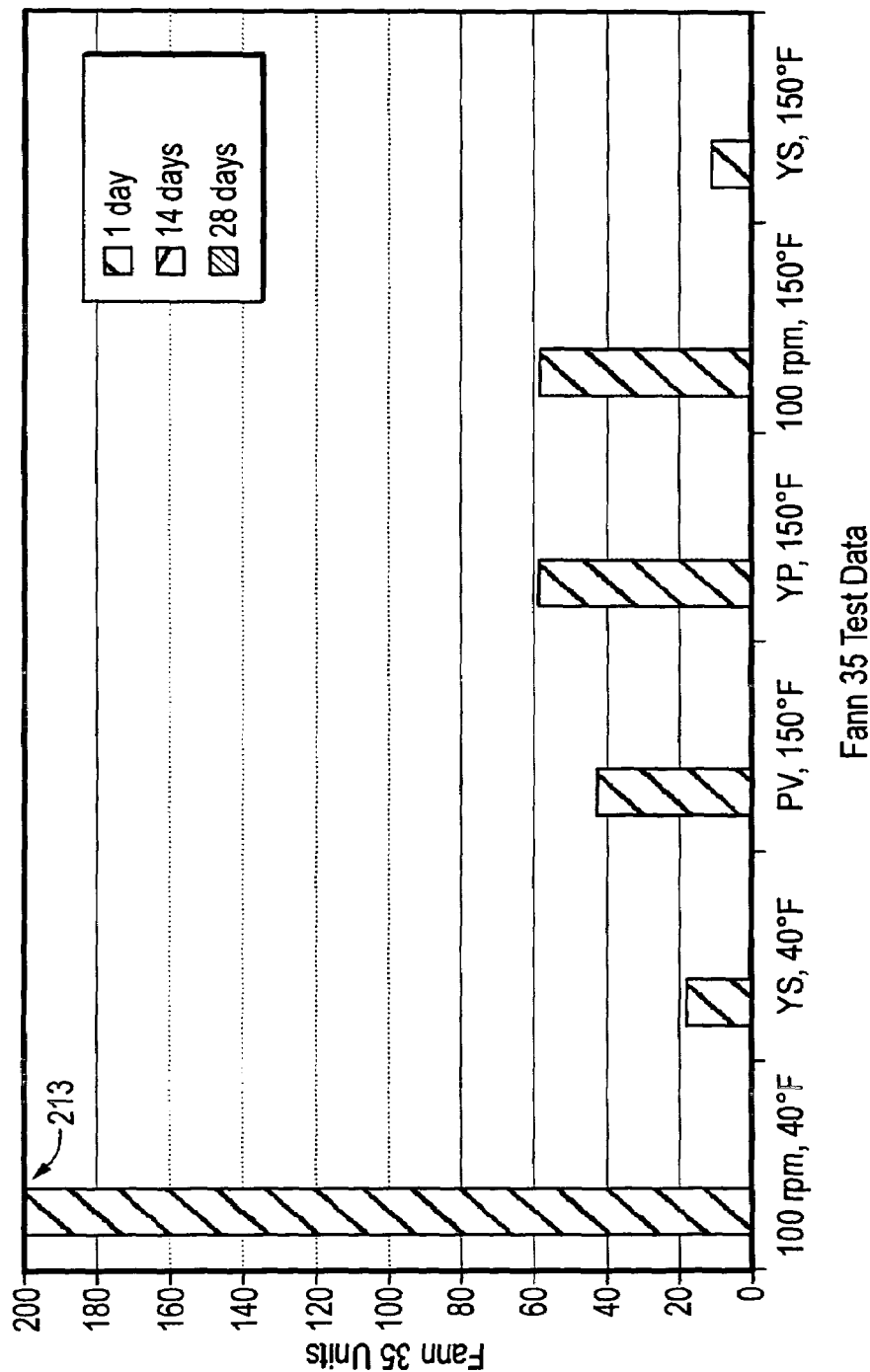
FIG. 5 is a chart of the Fann 35 Test Results [148.9° C.(300° F.) Static-Aging] for the thermal insulating composition of Example 5.

Static aging tests were performed on the thermal insulating composition for 1, 14, and 28 days at 148.9° C. (300° F.). The results are shown in the FIG. 5.

| | Days Static-Aged at 93.3° C. (200° F.) | | | | | |
|---|---|---|---|---|---|---|
| | 1 day | | 14 days | | 28 days | |
| | Fann Test Temp., °C. (° F.) | | | | | |
| | 4.4° C. (40° F.) | 65.6° C. (150° F.) | 4.4° C. (40° F.) | 65.6° C. (150° F.) | 4.4° C. (40° F.) | 65.6° C. (150° F.) |
| 600 rpm | 300+ | 110 | 300+ | 103 | 300+ | 116 |
| 300 rpm | 276 | 75 | 300+ | 70 | 300+ | 79 |
| 200 rpm | 214 | 60 | 240 | 55 | 244 | 63 |
| 100 rpm | 140 | 41 | 158 | 38 | 159 | 43 |
| 6 rpm | 26 | 12 | 30 | 10 | 30 | 11 |
| 3 rpm | 18 | 10 | 21 | 9 | 21 | 9 |
| Plastic Viscosity, cP | — | 35 | — | 33 | — | 37 |
| Yield Point, $kg/m^2$ ($lb/100\ ft^2$) | — | 1.95 (40) | — | 1.8 (37) | — | 2 (42) |
| Gels, 10 sec/10 min. | 20/26 | 10/21 | 20/28 | 9/16 | 21/29 | 10/17 |
| Yield Stress, $kg/m^2$ ($lb/100\ ft^2$) | 0.5 (10) | 0.4 (8) | 0.6 (12) | 0.4 (8) | 0.6 (12) | 0.3 (7) |
| Column Height, inches | 4.375 | — | 4.375 | — | 4.375 | — |
| Separation? | no | — | no | — | no | — |
| Free Liquid Ht, cm(inches) | (0) 0 | — | (0) 0 | — | (0) 0 | — |
| Separation, % | 0.00% | — | 0.00% | — | 0.00% | — |
| Test Tube Measurements | | | | | | |
| Initial Height, cm (inches) | 5.1 (2.0) | — | 5.1 (2.0) | — | 5.1 (2.0) | — |
| Liq/Polymer Separation? | no | — | no | — | no | — |
| Final Height, cm (inches) | 5.1 (2.0) | — | 5.1 (2.0) | — | 5.1 (2.0) | — |
| Change, % | 0% | — | 0% | — | 0% | — |

|  | Days Static-Aged at 148.9° C. (300° F.) | | | | | |
|---|---|---|---|---|---|---|
|  | 1 day | | 14 days | | 28 days | |
|  | Fann Test Temp., ° C. (° F.) | | | | | |
|  | 4.4° C. (40° F.) | 65.6° C. (150° F.) | 4.4° C. (40° F.) | 65.6° C. (150° F.) | 4.4° C. (40° F.) | 65.6° C. (150° F.) |
| 600 rpm | 300+ | 142 | unable | unable | unable | unable |
| 300 rpm | 300+ | 100 | to | to | to | to |
| 200 rpm | 300+ | 81 | run | run | run | run |
| 100 rpm | 213 | 58 | — | — | — | — |
| 6 rpm | 43 | 16 | — | — | — | — |
| 3 rpm | 30 | 13 | — | — | — | — |
| Plastic Viscosity, cP | — | 42 | — | — | — | — |
| Yield Point, kg/m$^2$ (lb/100 ft$^2$) | — | 2.8 (58) | — | — | — | — |
| Gels, 10 sec/10 min. | 29/44 | 11/36 | — | — | — | — |
| Yield Stress, kg/m$^2$ (lb/100 ft$^2$) | 0.8 (17) | 0.5 (10) | — | — | — | — |
| Column Height, cm (inches) | 11.4 (4.5) | — | 11.4 (4.5) | — | 11.4 (4.5) | — |
| Separation? | no | — | no | — | no | — |
| Final Col. Ht, cm (inches) | 0 (0) | — | 14 (5.5) | — | 14 (5.5) | — |
| Separation/Increase, % | 0.00% | — | 22.2% | — | 22.2% | — |
| Test Tube Measurements | | | | | | |
| Initial Height, cm (inches) | 5 (2.0) | — | 5 (2.0) | — | 5 (2.0) | — |
| Liq/Polymer Separation? | no | — | bubbles | — | bubbles | — |
| Final Height, cm (inches) | 6 (2.38) | — | 7.3 (2.88) | — | 7.3 (2.88) | — |
| Change, % | 18.8% | — | 43.8% | — | 43.8% | — |

After static-aging of the thermal insulation composition at 148.9° C. (300° F.), the fluid turned to an oatmeal-like consistency. The fluid was very thick and rheological properties could not be measured. Further formulation refinements are expected to improve the foregoing results. Retort tests were run to determine if the fluid had lost water during static-age testing, but test results of the 14 day, 148.9° C. (300° F.) static-aged fluid were exactly the same as the base fluid.

Example 6

Figure 6:
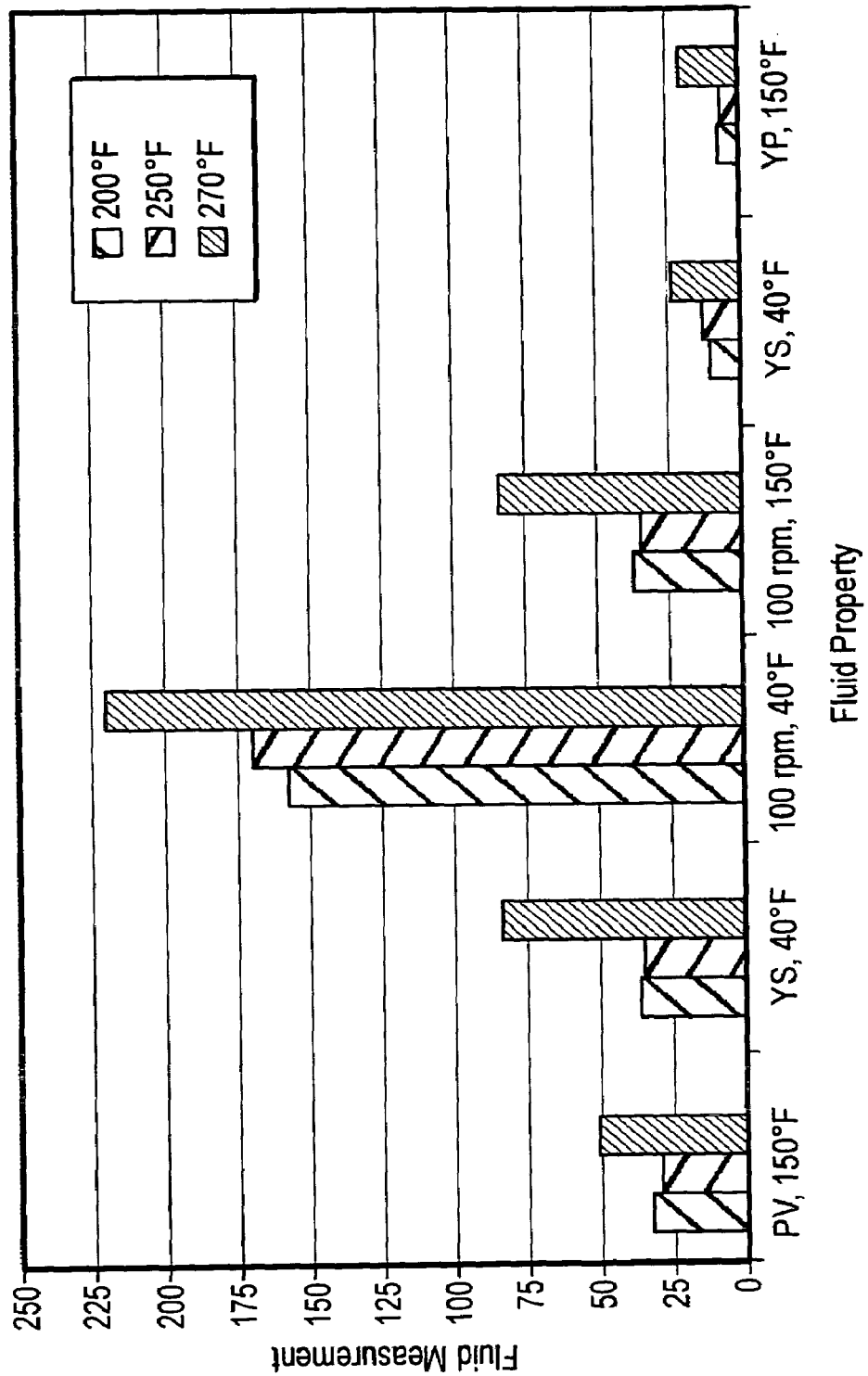
FIG. 6 is a chart of the changes in the thermal insulation composition after static-aging for 14 days, Example 6.

Additional 14 day static-age tests were conducted at 121.1° C.(250° F.) and 132.2° C.(270° F.) to determine the temperature stability of the thermal insulation composition. The results are shown in the FIG. 6.

|  | Static-Age Temp, ° C. (° F.) | | | | | | | |
|---|---|---|---|---|---|---|---|---|
|  | 93.3° C. (200° F.) | | 121.1° C. (250° F.) | | 132.2° C. (270° F.) | | 148.9° C. (300° F.) | |
|  | Fann Test Temp, ° C. (° F.) | | | | | | | |
|  | 4.4° C. (40° F.) | 65.6° C. (150° F.) | 4.4° C. (40° F.) | 65.6° C. (150° F.) | 4.4° C. (40° F.) | 65.6° C. (150° F.) | 4.4° C. (40° F.) | 65.6° C. (150° F.) |
| 600 rpm | 300+ | 103 | 300+ | 95 | 300+ | 188 | unable | unable |
| 300 rpm | 300+ | 70 | 300+ | 65 | 300+ | 136 | to | to |
| 200 rpm | 240 | 55 | 261 | 52 | 300+ | 114 | run | run |
| 100 rpm | 158 | 38 | 171 | 36 | 221 | 84 | — | — |
| 6 rpm | 30 | 10 | 33 | 11 | 50 | 29 | — | — |
| 3 rpm | 21 | 9 | 23 | 9 | 37 | 25 | — | — |
| Plastic Viscosity, cP | — | 33 | — | 30 | — | 52 | — | — |
| Yield Point, kg/m$^2$ (lb/100 ft$^2$) | — | 1.8 (37) | — | 1.7 (35) | — | 4 (84) | — | — |
| Gels, 10 sec/10 min. | 20/28 | 9/16 | 21/29 | 9/15 | 34/76 | 26/98 | — | — |
| Yield Stress, kg/m$^2$ (lb/100 ft$^2$) | 0.6 (12) | 0.4 (8) | 0.6 (13) | 0.3 (7) | 1 (24) | 1 (21) | — | — |
| Column Height, cm (inches) | 11 (4.375) | — | 11.4 (4.5) | — | 11.4 (4.5) | — | 11.4 (4.5) | — |
| Separation? | no | — | no | — | no | — | no | — |
| Final Col. Ht, cm (inches) | 0 (0) | — | 0 (0) | — | 14 (5.5) | — | 14 (5.5) | — |
| Separation/Increase, % | 0.00% | — | 0.00% | — | 22.2% | — | 22.2% | — |
| Test Tube Measurements | | | | | | | | |
| Initial Height, cm (inches) | 5 (2.0) | — | 5 (2.0) | — | 5 (2.0) | — | 5 (2.0) | — |
| Liq/Polymer Separation? | no | — | bubbles | — | bubbles | — | bubbles | — |
| Final Height, cm (inches) | 5 (2.0) | — | 7.5 (2.94) | — | 7.9 (3.125) | — | 7.3 (2.8750) | — |
| Change, % | 0% | — | 47% | — | 56% | — | 44% | — |

Static-age tests, conducted for 14 days at 121.1° C.(250° F.) and 132.2° C.(270° F.), indicate that the thermal insulation composition is stable at temperatures approaching 132.2° C.(270° F.). The fluid's yield point could not be measured at 4.4° C.(40° F.), due to 300+ dial readings at 600 and 300 rpm. Ten minute gel strength were very similar at both 93.3° C.(200° F.) and 121.1° C.(250° F.) (28 and 29, respectively), but increased to 76 at 132.2° C.(270° F.). 100 rpm dial readings increased from 93.3° C.(200° F.) to 121.1° C.(250° F.) and 132.2° C.(270° F.) (158, 171, 221, respectively). Similar increases in yield stress were also seen. The fluid properties did not change between 93.3° C.(200° F.) and 121.1° C.(250° F.). At 132.2° C.(270° F.), all properties showed an increase.

Test tube measurements and photographs show that the height of the fluid is increased during static-aging. There was no column height change at 93.3° C.(200° F.), but at 121.1° C.(250° F.), the fluid column increased by 47%. At 132.2° C.(270° F.) and 148.9° C. (300° F.), the test tube fluid column increased by 56% and 44%, respectively. The test tube fluid column contained numerous bubbles, or cavities, although these cavities did not appear to contain free liquid. Further formulation refinements are expected to improve the foregoing results.

Example 7

The thermal insulation composition was cycled between 4.4° C.(40° F.) and 93.3° C.(200° F.) for 24 days. The fluid was cooled for three days at 4.4° C.(40° F.) then transferred to a 93.3° C.(200° F.) oven and static-aged for three days. This cycle was repeated four times. The results are given in the following Table:

| | Cycling Time, Test Temp, ° C.(° F.) | | | |
|---|---|---|---|---|
| | 24 days at 93.3° C. (200° F.) | | 24 days at 148.9° C. (300° F.) | |
| | Fann Test Temp., ° F. | | | |
| | 4.4° C. (40° F.) | 65.6° C. (150° F.) | 4.4° C. (40° F.) | 65.6° C. (150° F.) |
| 600 rpm | 300+ | 99 | unable to run | unable to run |
| 300 rmp | 292 | 68 | | |
| 200 rmp | 226 | 54 | | |
| 100 rmp | 147 | 38 | — | — |
| 6 rpm | 28 | 11 | — | — |
| 3 rpm | 19 | 9 | — | — |

-continued

| | Cycling Time, Test Temp, ° C.(° F.) | | | |
|---|---|---|---|---|
| | 24 days at 93.3° C. (200° F.) | | 24 days at 148.9° C. (300° F.) | |
| | Fann Test Temp., ° F. | | | |
| | 4.4° C. (40° F.) | 65.6° C. (150° F.) | 4.4° C. (40° F.) | 65.6° C. (150° F.) |
| Plastic Viscosity, cP | — | 31 | — | — |
| Yield Point, kg/m$^2$ (lb/100 ft$^2$) | — | 1.8 (37) | — | — |
| Gels, 10 sec/10 min. Yield Stress, kg/m$^2$ (lb/100 ft$^2$) | 20/26 | 10/17 | — | — |
| Column Height, cm (inches) | 11.4 (4.5) | — | 11.4 (4.5) | — |
| Separation? | no | — | no | — |
| Final Col. Ht, cm (inches) | 12.4 (4.875) | — | 14 (5.5) | — |
| Separation/Increase, % Test Tube Measurements | 8.33% | — | 22.2% | — |
| Initial Height, cm (inches) | 5 (2.0) | — | 5 (2.0) | — |
| Liq/Polymer Separation? | no | — | no | — |
| Final Height, (cm) inches | 5 (2.0) | — | 5.2 (2.06) | — |
| Change, % | 0.0% | — | 3.1% | — |

Cycling between 4.4° C.(40° F.) and 93.3° C.(200° F.) had no effect on the viscosity of the insulating fluid. Compared to initial test results, there was no change in rheological properties measured at both 4.4° C.(40° F.) and 65.6° C.(150° F.).

Cycling between 4.4° C.(40° F.) and 148.9° C. (300° F.) resulted in the fluid setting up, as seen in the 148.9° C. (300° F.) static-aging tests. Again, the fluid had a very thick consistency like oatmeal.

Example 8

In order to test the effectiveness of the viscosifiers in the thermal insulating composition, the pH of the composition was reduced from 9.60 to 7.08 with 4.5 mL of 2.89 N hydrochloric acid. After reducing the pH, the insulating fluid was static-aged for 72 hours at 93.3° C.(200° F.). After cooling to room temperature, the static-aged fluid was tested at 4.4° C.(40° F.) and 65.6° C.(150° F.) for Theological properties. The results are given in the following Table:

| | Fluid pH Reduced to 7.0 Static-Aged 72 Hours | | Base Fluid Static-Aged 24 Hours (Comparison) | |
|---|---|---|---|---|
| | Static-Age Temp, ° C. (° F.) | | | |
| | 93.3° C. (200° F.) | | 93.3° C. (200° F.) | |
| | Fann 35 Test Temp., ° C. (° F.) | | | |
| | 4.4° C. (40° F.) | 65.6° C. (150° F.) | 4.4° C. (40° F.) | 65.6° C. 150° C. (° F.) |
| 600 rpm | 300+ | 284 | 300+ | 142 |
| 300 rpm | 300+ | 226 | 300+ | 100 |
| 200 rpm | 300+ | 207 | 300+ | 81 |
| 100 rpm | 300+ | 170 | 213 | 58 |
| 6 rpm | 201 | 83 | 43 | 16 |

| | Fluid pH Reduced to 7.0 Static-Aged 72 Hours | | Base Fluid Static-Aged 24 Hours (Comparison) | |
|---|---|---|---|---|
| | Static-Age Temp., °C. (°F.) | | | |
| | 93.3° C. (200° F.) | | 93.3° C. (200° F.) | |
| | Fann 35 Test Temp., °C. (°F.) | | | |
| | 4.4° C. (40° F.) | 65.6° C. (150° F.) | 4.4° C. (40° F.) | 65.6° C. 150° C. (°F.) |
| 3 rpm | 170 | 63 | 30 | 13 |
| Plastic Viscosity, cP | — | 58 | — | 42 |
| Yield Point, kg/m² (lb/100 ft²) | — | 8.2 (168) | — | 2.8 (58) |
| Gels, 10 sec/10 min. | 162/162 | 63/66 | 29/44 | 11/36 |
| Yield Stress, kg/m² (lb/100 ft²) | 6.8 (139) | 2 (43) | 0.8 (17) | 0.5 (10) |
| Column Height, cm (inches) | 10.2 (4) | — | 11.4 (4.5) | — |
| Separation? | trace | — | no | — |
| Free Liquid Ht, cm (inches) | trace | — | no | — |
| Initial pH | 9.60 | — | — | — |
| pH after 72 hr test | 7.08 | — | — | — |
| 10% HCl, mL (10% HCl = 2.89 N) | 4.5 | — | — | — |

Test results showed that the thermal insulation composition was affected by this reduction in pH. At 4.4° C.(40° F.), the thermal insulation composition treated with acid had flat gel strengths of 162 (ten second and ten minute) compared to 29 and 44 for the thermal insulation composition that had been static-aged for 24 hours at 93.3° C.(200° F.). Yield stress values were 6.8 kg/m² (139 lb/100 ft²) with acid, compared to 0.8 kg/m² (17 lb/100 ft²) without acid. Similar changes due to acid treatment were seen at 65.6° C.(150° F.) [gels of 63/66 and yield stress of 2 kg/m² (43 lb/100 ft²) compared to 11/36 gels and a yield stress of 0.5 kg/m² (10 lb/100 ft²) without acid treatment].

Example 9

Figure 7:
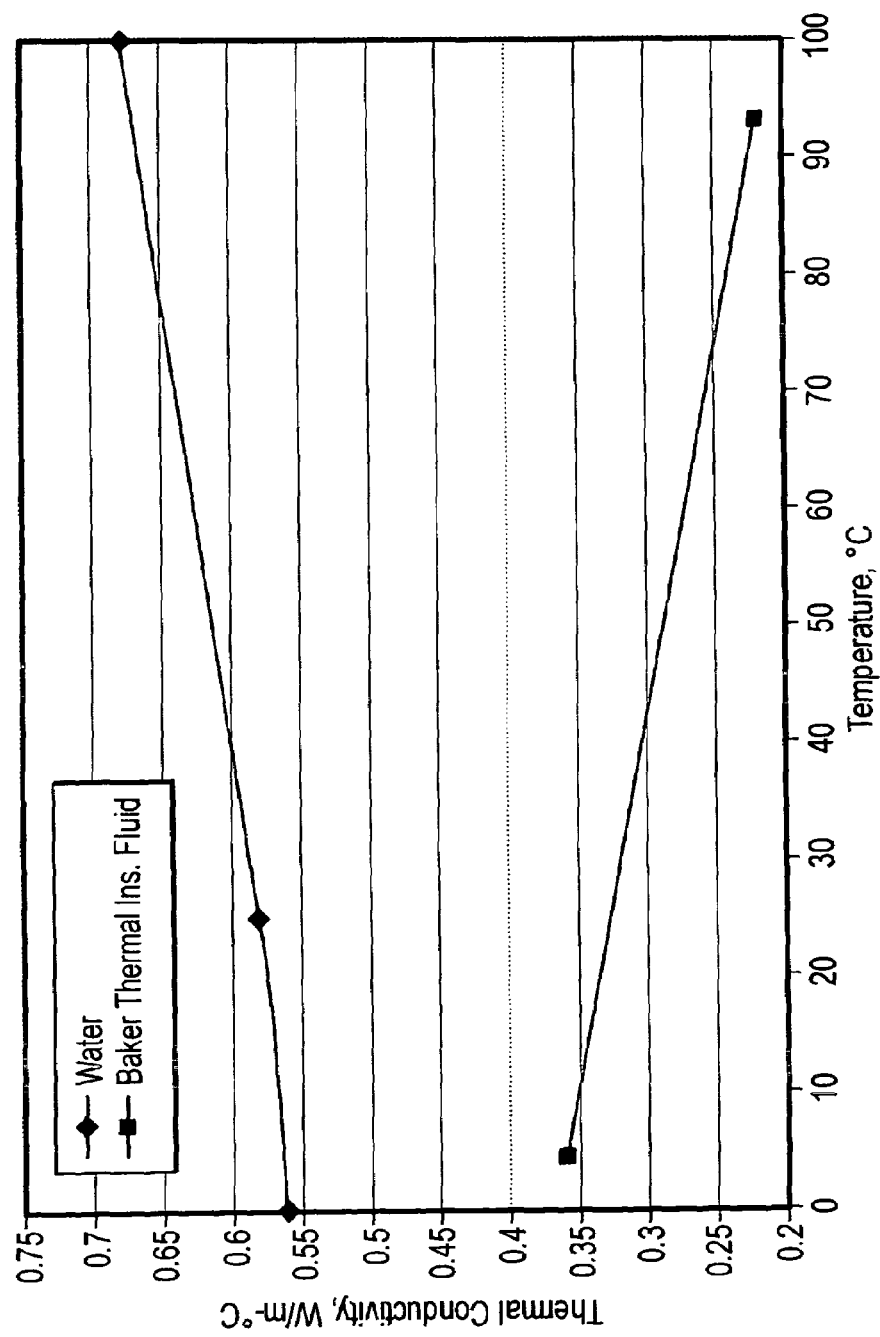
FIG. 7 is a chart of the conductivity test results for the thermal insulating composition of Example 9.

Thermal conductivity values (k) were measured at 4.4° C. (40° F.) and 93.3° C. (200° F.). The results are illustrated in FIG. 7. At 4.4° C., the thermal insulation composition had a thermal conductivity measurement of 0.36 W/m-° C. At 93.3° C., thermal conductivity was measured at 0.22 W/m-° C. These thermal conductivity values compare favorably to published thermal conductivity values for water (0.561 W/m-° C. at 0° C. and 0.679 W/m-° C. at 100° C.).

Example 10

Using the Westport Wellbore Insulation Model tester, the convective heat transfer coefficient for the thermal insulation composition was calculated to be 3.09 BTU/ft²hr° F., or 17.55 W/m²° C. The calculated convective heat transfer coefficients of water were 71.73 BTU/ft²hr° F., or 407.28 W/m²° C. The thermal insulation composition had a convective heat transfer coefficient 95.69% lower than water.

Figure 8:
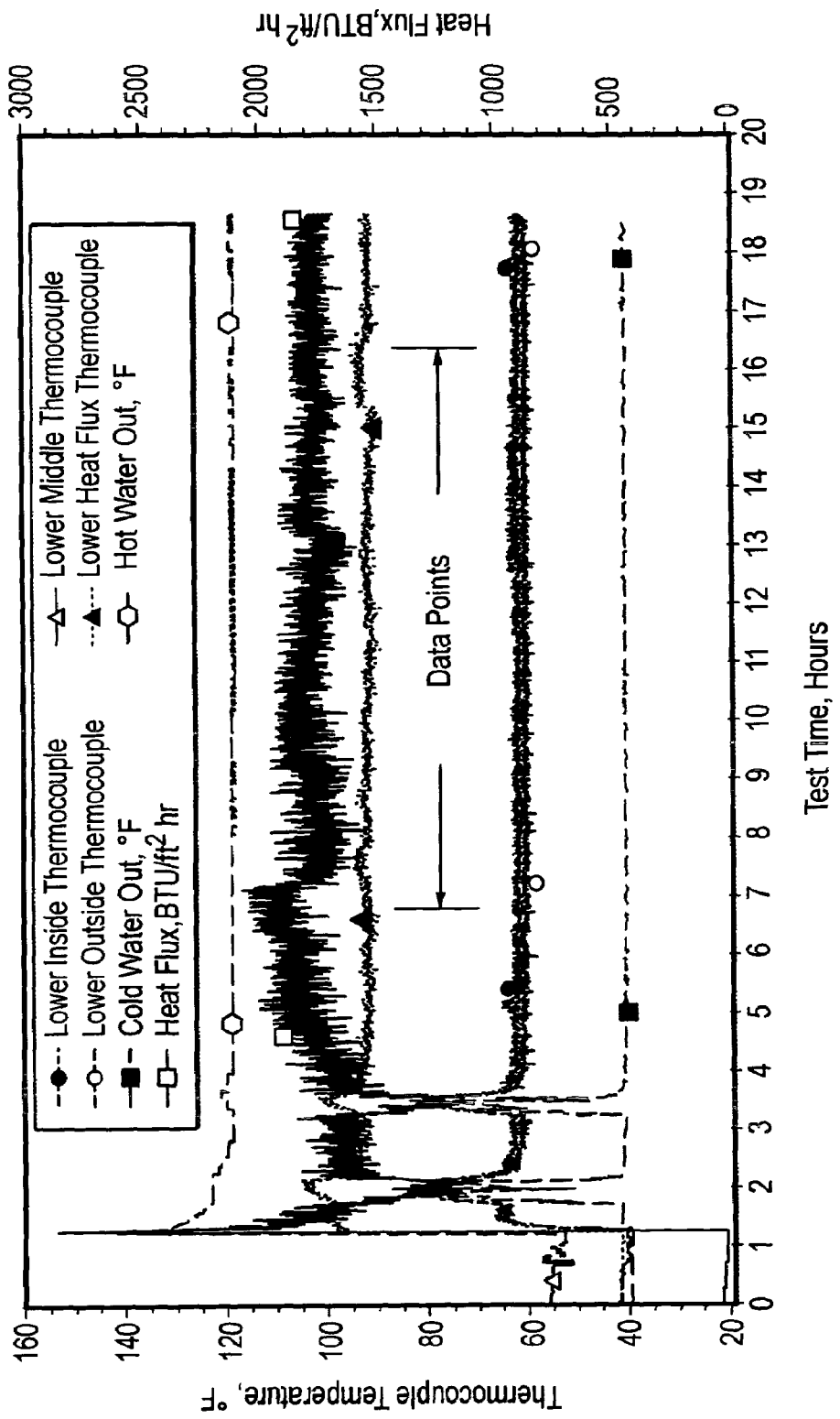
FIG. 8 is a chart of the convective heat transfer coefficient (CHTC) test results for water (Example 10).
Figure 9:
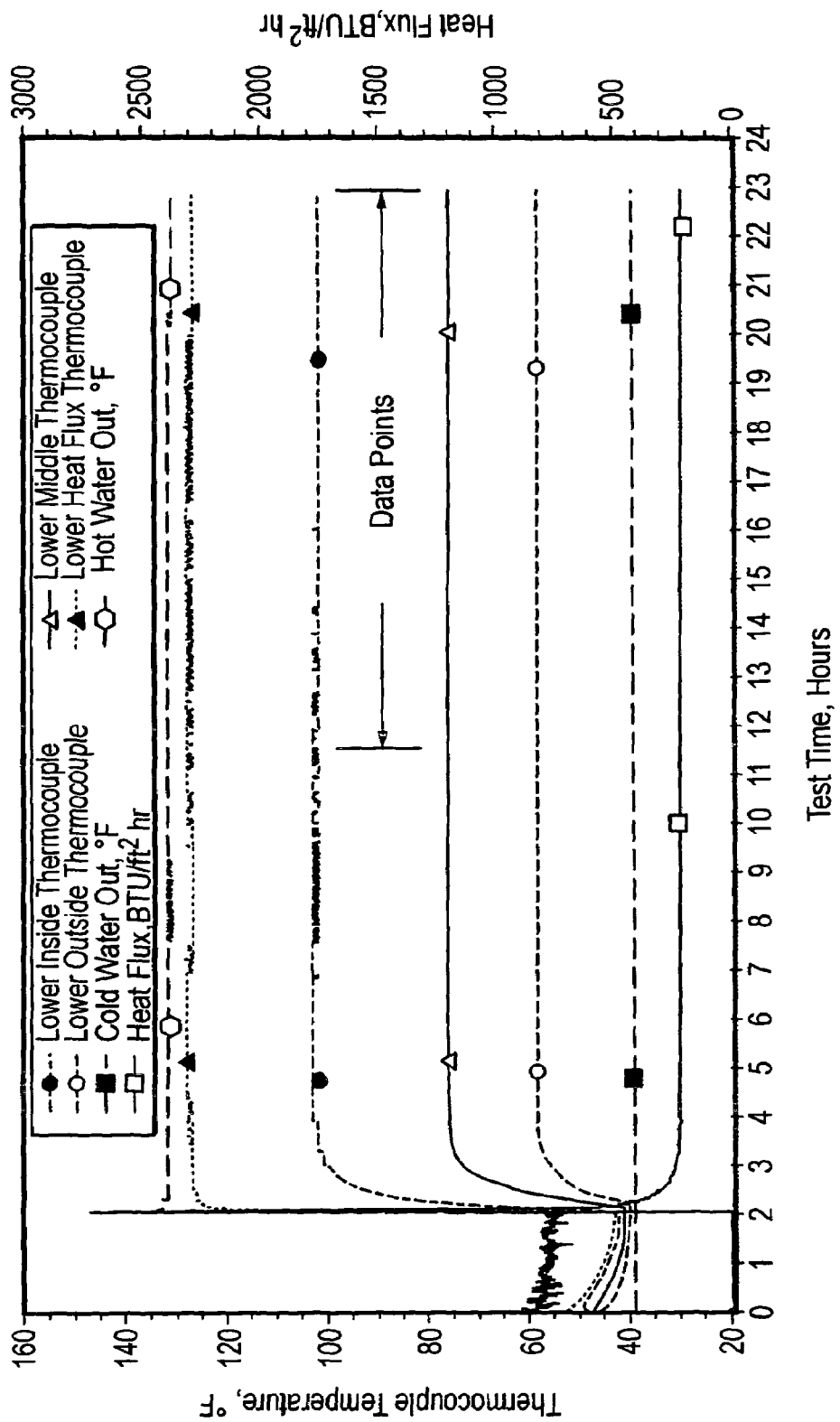
FIG. 9 is a chart of the convective heat transfer coefficient (CHTC) test results for the thermal insulating composition (Example 10).
Figure 10:
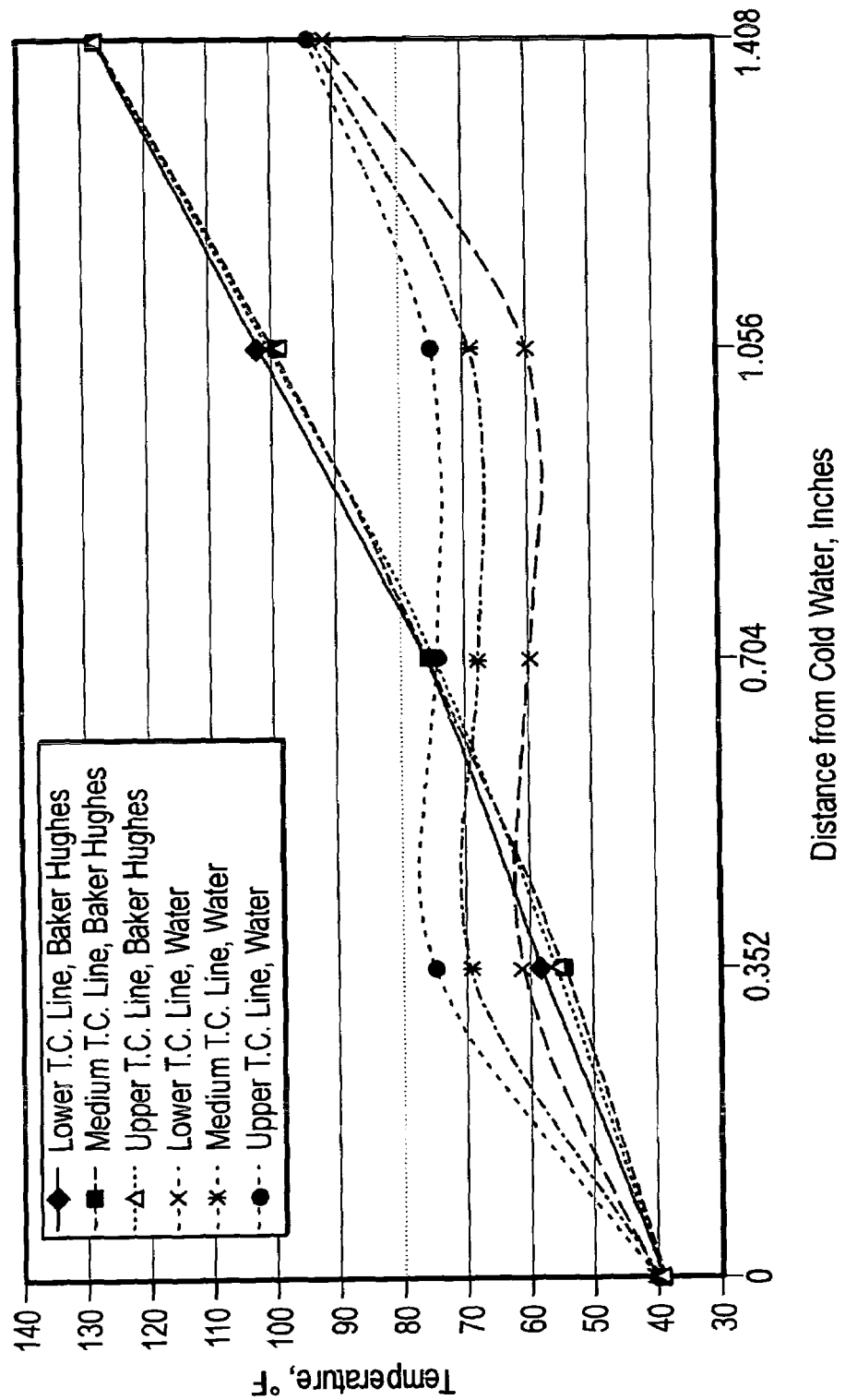
FIG. 10 is a chart of the wellbore model temperature profiles for water and for the thermal insulating composition (Example 10).

FIG. 8 shows the temperature profile of water and the thermal insulation composition in the Wellbore Insulation Model. The much flatter and separate temperature profile for water shows the effect of convective heat transfer. The temperature spike seen in FIG. 8 (fresh water) was the result of the chiller water pump stopping. Corrective action was taken, and no further upsets of this nature were seen. FIG. 9 shows the Convective Heat Transfer Coefficient (CHTC) Test Results, as seen from the temperature recorded for various thermocouples and/or heat flux sensor/thermocouple over time. FIG. 10 shows the Wellbore Model Temperature Profiles for water and the thermal insulation composition, as seen from the temperature vs. the distance from cold water (inches) for various thermocouples.

Persons of ordinary skill in the art will recognize that many modifications may be made to the foregoing description. The embodiments described herein are meant to be illustrative only and should not be taken as limiting the invention, which will be defined in the claims.

We claim:

1. A thermal insulation composition comprising:
   aqueous base;
   from about 0.28 kg/m³ (0.1 lb/bbl) to about 35 kg/m³ (12 lb/bbl) polymeric viscosifier comprising sulfonate moiety;
   from about 14.3 kg/m³ (5 lb/bbl clay) to about 428.6 kg/m³ (150 lb/bbl) clay; and,
   from about 0.28 kg/m³ (0.1 lb/bbl) to about 14.3 kg/m³ (5 lb/bbl) deflocculant comprising cyclic diketene monomer having the following general structure:

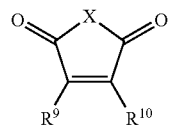

wherein
   X is selected from the group consisting of oxygen and nitrogen; and,
   $R^9$ and $R^{10}$ independently are selected from the group consisting of hydrogen and alkyl groups; and,
styrene monomer having the following structure:

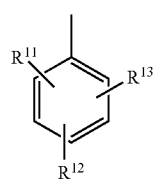

wherein $R^{11}$, $R^{12}$, and $R^{13}$ independently are selected from the group consisting of hydrogen and an alkyl groups.

2. A thermal insulation composition comprising:
aqueous base;
one or more primary viscosifier comprising a quantity of clay;
an amount of one or more polymeric viscosifier comprising sulfonate moiety; and
a concentration of deflocculant comprising cyclic diketene monomer having the following general structure:

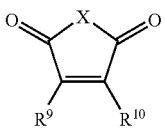

wherein
X is selected from the group consisting of oxygen and nitrogen; and,
$R^9$ and $R^{10}$ independently are selected from the group consisting of hydrogen and alkyl groups; and
wherein the thermal insulation composition comprises a viscosity of about 1800 cP or more at about 1 rpm or less at a temperature of from 4.4° C.(40° F.) to 65.6° C.(150° F.) and a viscosity of about 200 cP or less at 200 rpm or more at temperatures of from 4.4° C.(40° F.) to 65.6° C.(150° F.).

3. The thermal insulation composition of claim 2 wherein the deflocculant further comprises the reaction product of styrene monomer having the following structure:

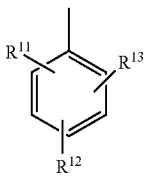

wherein $R^{11}$, $R^{12}$, and $R^{13}$ independently are selected from the group consisting of hydrogen and an alkyl groups having from 1 to 4 carbon atoms.

4. A thermal insulation composition comprising:
aqueous base;
one or more primary viscosifier comprising a quantity of clay;
an amount of one or more polymeric viscosifier comprising sulfonate moiety; and
a concentration of deflocculant comprising poly(styrene-co-maleic anhydride); and
wherein the thermal insulation composition comprises a viscosity of about 1800 cP or more at about 1 rpm or less at a temperature of from 4.4° C.(40° F.) to 65.6° C.(150° F.) and a viscosity of about 200 cP or less at 200 rpm or more at temperatures of from 4.4° C.(40° F.) to 65.6° C.(150° F).

5. A thermal insulation composition comprising:
aqueous base;
from about 0.28 kg/m³ (0.1 lb/bbl) to about 35 kg/m³(12 lb/bbl) polymeric viscosifier comprising sulfonate moiety;
from about 14.3 kg/m³ (5 lb/bbl clay) to about 428.6 kg/m³ (150 lb/bbl) clay; and,
from about 0.28 kg/m³ (0.1 lb/bbl) to about 14.3 kg/m³ (5 lb/bbl) deflocculant comprising poly(styrene-co-maleic anhydride);and wherein the thermal insulation composition comprises a viscosity of about 1800 cP or more at about 1 rpm or less at a temperature of from 4.4° C. (40° F.) to 65.6° C.(150° F) and a viscosity of about 200 cP or less at 200 rpm or more at temperatures of from 4.4° C.(40° F.) to 65.6° C.(150° F.).

6. A thermal insulation composition comprising:
aqueous base comprising one or more polyol;
one or more primary viscosifier comprising a quantity of sepiolite; and, an amount of one or more polymeric viscosifier comprising sulfonate moiety; and, deflocculant comprising cyclic diketene monomer having the following general structure:

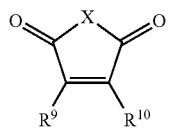

wherein
X is selected from the group consisting of oxygen and nitrogen; and,
$R^9$ and $R^{10}$ independently are selected from the group consisting of hydrogen and alkyl groups.

7. The thermal insulation composition of claim 6 wherein the composition remains homogeneous for 14 days or more after exposure to static aging conditions comprising a temperature of 121.1° C.(250 ° F.) or less.

8. The thermal insulation composition of claim 7 comprising:
a viscosity of about 1800 cP or more at about 1 rpm or less at a temperature of from 4.4° C.(40° F.) to 65.6° C.(150° F.); and,
a viscosity of about 200 cP or less at 200 rpm or more at temperatures of from 4.4° C.(40° F.) to 65.6° C.(150° F.).

9. The thermal insulation composition of claim 6 having an overall heat transfer coefficient which is 95% or more lower than that measured for water under the same conditions.

10. The thermal insulation composition of claim 8 having an overall heat transfer coefficient which is 95% or more lower than that measured for water under the same conditions.

11. The thermal insulation composition of claim 6 wherein the one or more polymeric viscosifier comprises polymerized 2-acrylamido-2-methylpropane sulfonic acid or alkali metal salt thereof.

12. The thermal insulation composition of claim 10 wherein the one or more polymeric viscosifier comprises polymerized 2-acrylamido-2-methylpropane sulfonic acid or alkali metal salt thereof.

13. The thermal insulation composition of claim 7 wherein the one or more polymeric viscosifier comprises polymerized 2-acrylamido-2-methylpropane sulfonic acid or alkali metal salt thereof.

14. The thermal insulation composition of claim 10 comprising:
from. about 0.28 kg/m³ (0.1 lb/bbl) to about 35 kg/m³(12 lb/bbl) polymeric viscosifier; and,
from about 14.3 kg/m³ (5 lb/bbl clay) to about 428.6 kg/m³ (150 lb/bbl) clay; and,
from about 0.28 kg/m³ (0.1 lb/bbl) to about 14.3 kg/m³ (5 lb/bbl) deflocculant comprising anionic polymer other than polysaccharide comprising one or more non-carboxylic-oyl group.

15. A thermal insulation composition comprising:
aqueous base;
one or more primary viscosifier comprising a quantity of sepiolite; and,
an amount of one or more polymeric viscosifier comprising sulfonate moiety; and,
a concentration of deflocculant comprising polymer comprising:
the reaction product of cyclic diketene monomer having the following general structure:

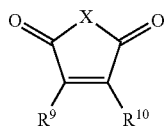

wherein
X is selected from the group consisting of oxygen and nitrogen; and, $R^9$ and $R^{10}$ independently are selected from the group consisting of hydrogen and alkyl groups; and,
the reaction product of styrene monomer having the following structure:

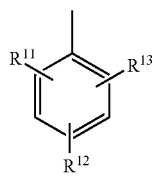

wherein $R^{11}$, $R^{12}$, and $R^{13}$ independently are selected from the group consisting of hydrogen and an alkyl groups having from 1 to 4 carbon atoms; and
wherein the thermal insulation composition comprises a viscosity of about 1800 cP or more at about 1 rpm or less at a temperature of from 4.4° C.(40° F.) to 65.6° C.(150° F.) and a viscosity of about 200 cP or less at 200 rpm or more at temperatures of form 4.4° C.(40° F.).

16. A thermal insulation composition comprising:
aqueous base;
one or more primary viscosifier comprising a quantity of sepiolite;
an amount of one or more polymeric viscosifier comprising sulfonate moiety; and
a concentration of deflocculant comprising poly(styrene-co-maleic anhydride);
wherein the composition remains homogeneous for 14 days or more after exposure to static aging conditions comprising a temperature of 121.1° C.(250° F.) or less; and
wherein the thermal insulation composition comprises a viscosity of about 1800 cP or more at about 1 rpm or less at a temperature of from 4.4° C.(40° F.)to 65.6° C.(150° F.) and a viscosity of about 200 cP or less at 200 rpm or more at temperatures of from 4.4° C.(40° F.) to 65.6° C.(150° F.).

17. A thermal insulation composition comprising:
an aqueous base;
about 86 kg/m³(30 lb/bbl) sepiolite clay;
about 11.1 kg/m³(3.9 lb/bbl) 2 acrylamido-2-methyl propane sulfonic acid polymeric viscosifier;
about 2.14 kg/m³ (0.75 lb/bbl) deflocculant comprising poly(styrene-co-maleic anhydride); and,
about 60 vol. % polyol composition; and
wherein the thermal insulation comprises a viscosity of about 1800 cP or more at about 1 rpm or less at a temperature of from 4.4° c.(40° F.) to 65.6° C.(150° F.) and a viscosity of about 200 cP or less at 200 rpm or more at temperatures of from 4.4° C.(40° F.) to 65.6° C.(150° F.).

18. The thermal insulation composition of claim 17 wherein the polyol composition comprises about 95 vol. % propylene glycol and about 5 vol. % glycerol.

19. The thermal insulating composition of claim 1 wherein the composition remains homogeneous for 14 days or more after exposure to static aging conditions comprising a temperature of 45.6° C.(150 ° F.) or more.

20. The thermal insulation composition of claim 1 wherein the composition remains homogeneous for 14 days or more after exposure to static aging conditions comprising a temperature of 121.1° C.(250° F.) or less.

21. The thermal insulation composition of claim 1 comprising:
a viscosity of about 1800 cP or more at about 1 rpm or less at a temperature of from 4.4° C.(40° F.) to 65.6° C.(150° F.); and,
a viscosity of about 200 cP or less at 200 rpm or more at temperatures of from 4.4° C.(40° F.) to 65.6° C.(150° F.).

22. The thermal insulation composition of claim 1 having an overall heat transfer coefficient which is 95% or more lower than that measured for water under the same conditions.

23. The thermal insulation composition of claim 5 having an overall heat transfer coefficient which is 95% or more lower than that measured for water under the same conditions.

24. The thermal insulation composition of claim 1 wherein the one or more polyol comprises propylene glycol.

25. The thermal insulating composition of claim 2 wherein the composition remains homogeneous for 14 days or more after exposure to static aging conditions comprising a temperature of 45.6° C.(150° F.) or more.

26. The thermal insulation composition of claim 2 wherein the composition remains homogeneous for 14 days or more after exposure to static aging conditions comprising a temperature of 121.1° C.(250° F.) or less.

27. The thermal insulation composition of claim 2 having an overall heat transfer coefficient which is 95% or more lower than that measured for water under the same conditions.

28. The thermal insulation composition of claim 3 having an overall heat transfer coefficient which is 95% or more lower than that measured for water under the same conditions.

29. The thermal insulation composition of claim 2 wherein the aqueous base comprises one or more polyol.

30. A thermal insulation composition comprising:
aqueous base;
one or more primary viscosifier comprising a quantity of sepiolite;
an amount of one or more polymeric viscosifier comprising sultanate moiety; and,
a concentration of deflocculant comprising poly(styrene-co-maleic anhydride);
wherein the thermal insulation composition comprises a viscosity of about 1800 cP or more at about 1 rpm or less at a temperature of from 4.4° C.(40° F.) to 65.6° C.(150° F.) and a viscosity of about 200 cP or less at 200 rpm or more at temperatures of from 4.4° c.(40° F.)to 65.6° c.(150° F.).

* * * * *

UNITED STATES PATENT AND TRADEMARK OFFICE
CERTIFICATE OF CORRECTION

PATENT NO.        : 8,030,389 B2
APPLICATION NO.   : 11/519334
DATED             : October 4, 2011
INVENTOR(S)       : Mohammad Tej et al.

Page 1 of 1

It is certified that error appears in the above-identified patent and that said Letters Patent is hereby corrected as shown below:

Claim 14, Col. 28, Line 60
Please delete the "." after the word "from"

Claim 15, Col. 29, Line 40
Please delete "form" and insert therefore --from--
After (40°F.), please insert --to 65.6°C(150°F)--

Claim 30, Col. 30 Line 55
Please delete the word "sultanate" and insert the word --sulfonate--

Claim 30, Col. 30, Line 62
After the "4.4°", please delete "c" and insert therefore --C.--

Claim 30, Col. 30, Line 63
After the "65.6°", please delete "c" and insert therefore --C.--

Signed and Sealed this
Sixth Day of December, 2011

David J. Kappos
*Director of the United States Patent and Trademark Office*